US011304194B2

(12) United States Patent
Kim et al.

(10) Patent No.: US 11,304,194 B2
(45) Date of Patent: Apr. 12, 2022

(54) ELECTRONIC DEVICE FOR MANAGING BEARER AND OPERATION METHOD THEREOF

(71) Applicant: Samsung Electronics Co., Ltd., Gyeonggi-do (KR)

(72) Inventors: Jihwan Kim, Gyeonggi-do (KR); Junsuk Kim, Gyeonggi-do (KR); Taeseop Lee, Gyeonggi-do (KR); Jiyoung Cha, Gyeonggi-do (KR); Hyejeong Kim, Gyeonggi-do (KR); Sangho Lee, Gyeonggi-do (KR); Sunmin Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 16/695,332

(22) Filed: Nov. 26, 2019

(65) Prior Publication Data

US 2020/0170003 A1 May 28, 2020

(30) Foreign Application Priority Data

Nov. 27, 2018 (KR) .................. 10-2018-0148634

(51) Int. Cl.
*H04W 72/04* (2009.01)
*H04W 72/08* (2009.01)
*H04L 5/00* (2006.01)

(52) U.S. Cl.
CPC ......... *H04W 72/048* (2013.01); *H04L 5/0032* (2013.01); *H04W 72/0453* (2013.01); *H04W 72/085* (2013.01)

(58) Field of Classification Search
CPC ........... H04W 72/048; H04W 72/0453; H04W 72/085; H04W 76/11; H04W 76/15;
(Continued)

(56) References Cited

U.S. PATENT DOCUMENTS

2012/0250601 A1\* 10/2012 Choi ..................... H04W 88/04 370/315
2016/0255540 A1\* 9/2016 Kweon ................. H04W 76/15 370/237
(Continued)

FOREIGN PATENT DOCUMENTS

JP 2018-533231 A 11/2018
WO 2018/065936 A1 4/2018

OTHER PUBLICATIONS

International Search Report dated Feb. 21, 2020.
(Continued)

*Primary Examiner* — Kiet Tang
(74) *Attorney, Agent, or Firm* — Cha & Reiter, LLC.

(57) ABSTRACT

According to certain embodiments, an electronic device comprises at least one processor; and a memory operatively connected with the at least one processor and storing a plurality of identifiers related to attributes of a communication bearer. The memory stores instructions that, when executed by the at least one processor, cause the electronic device to: receive information related to multi radio access technology (RAT) dual connectivity (MR-DC) from a first base station (BS) connected with a first core network, using a first frequency band; transmit a first packet data network (PDN) connectivity request comprising a first identifier among the plurality of identifiers and a second PDN connectivity request comprising a second identifier among the plurality of identifiers to the first BS, using the first frequency band; establish a first PDN session with the first BS and the first core network, in which the first PDN session provides a communication bearer having a first attribute related to the first identifier; establish a second PDN session with the first BS and the first core network, in which the second PDN session provides a communication bearer having a second attribute related to the second identifier; receive
(Continued)

from the first BS, a message indicating that the first BS is connected with a second BS; and communicate using signals with the second BS and the first core network through the second PDN session based on at least a part of the message, using the second frequency band.

20 Claims, 18 Drawing Sheets

(58) Field of Classification Search
CPC ..... H04W 76/12; H04W 76/16; H04W 48/18; H04W 88/06; H04L 5/0032; H04L 5/0094; H04L 5/0044; H04L 5/0053
See application file for complete search history.

(56) References Cited

U.S. PATENT DOCUMENTS

| | | | |
|---|---|---|---|
| 2017/0265175 A1* | 9/2017 | Gandhi | ................ H04W 76/20 |
| 2018/0092124 A1 | 3/2018 | Han et al. | |
| 2018/0092142 A1 | 3/2018 | Han et al. | |
| 2018/0176866 A1 | 6/2018 | Papasakellariou et al. | |
| 2018/0199244 A1 | 7/2018 | Nylander et al. | |
| 2018/0279409 A1 | 9/2018 | Balasubramanian et al. | |
| 2019/0159117 A1* | 5/2019 | Kuge | ................ H04W 36/0022 |
| 2020/0359240 A1* | 11/2020 | Suzuki | ................ H04W 8/22 |
| 2021/0029715 A1* | 1/2021 | Takahashi | ............. H04W 76/15 |

OTHER PUBLICATIONS

Qualcomm Incorporated; "Handling of IMS PDN in 5G NR NSA Mode"; 3GPP Draft; 3rd Generation Partnership Project (3GPP); Mobile Competence Centre; Apr. 4, 2018; XP05149363.
Qualcomm Incorporated; "Handling of IMS PDN in 5G EN-DC Mode"; 3GPP Draft; 3rd Generation Partnership Project (3GPP); Mobile Competence Centre; May 25, 2018; XP051585582.
Qualcomm Incorporated; "Multi-PDN Handling in EN-DC"; 3rd Generation Partnership Project (3GPP); Mobile Competence Centre; Aug. 24, 2018; XP051586819.
European Search Report dated Aug. 10, 2021.

* cited by examiner

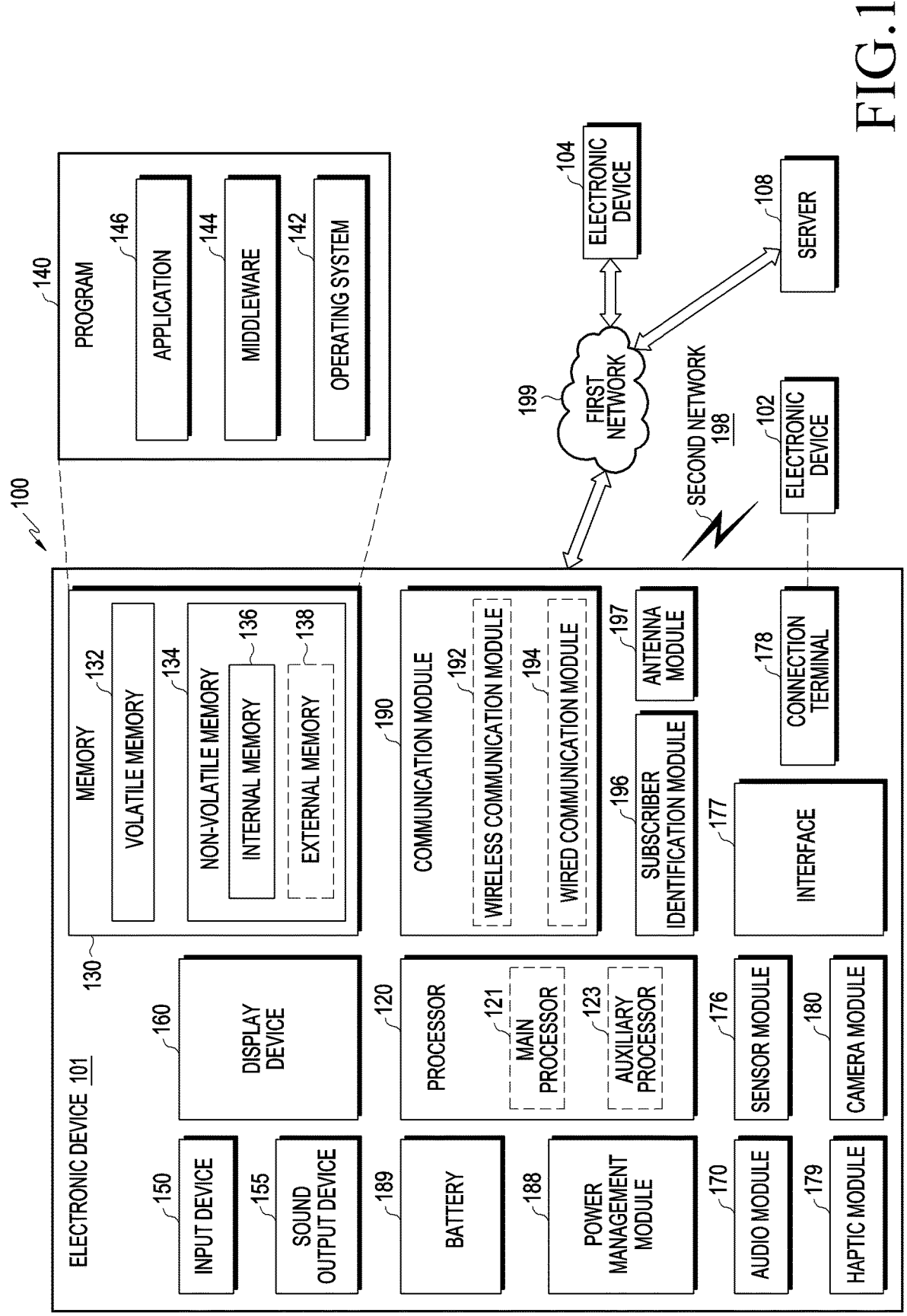

ELECTRONIC DEVICE FOR MANAGING BEARER AND OPERATION METHOD THEREOF

CROSS-REFERENCE TO RELATED APPLICATION(S)

This application is based on and claims priority under 35 U.S.C. § 119 to Korean Patent Application No. 10-2018-0148634, filed on Nov. 27, 2018, in the Korean Intellectual Property Office, the disclosure of which is incorporated by reference herein in its entirety.

BACKGROUND

Field

Certain embodiments of the present disclosure relate to an electronic device that manages a bearer and an operation method of the electronic device.

Description of Related Art

An electronic device can executed many different applications, with different characteristics and different communication quality requirements. However, if the Internet session does not have the quality requirements commensurate with the particular application used by the user, the user experience deteriorates. Accordingly, it is important for the internet session to have the qualities commensurate with the application.

The above information is presented as background information only to assist with an understanding of the present disclosure. No determination has been made, and no assertion is made, as to whether any of the above might be applicable as prior art with regard to the present disclosure.

SUMMARY

According to certain embodiments, an electronic device comprises at least one processor; and a memory operatively connected with the at least one processor and storing a plurality of identifiers related to attributes of a communication bearer. The memory stores instructions that, when executed by the at least one processor, cause the electronic device to: receive information related to multi radio access technology (RAT) dual connectivity (MR-DC) from a first base station (BS) connected with a first core network, using a first frequency band; transmit a first packet data network (PDN) connectivity request comprising a first identifier among the plurality of identifiers and a second PDN connectivity request comprising a second identifier among the plurality of identifiers to the first BS, using the first frequency band; establish a first PDN session with the first BS and the first core network, in which the first PDN session provides a communication bearer having a first attribute related to the first identifier; establish a second PDN session with the first BS and the first core network, in which the second PDN session provides a communication bearer having a second attribute related to the second identifier; receive from the first BS, a message indicating that the first BS is connected with a second BS; and communicate using signals with the second BS and the first core network through the second PDN session based on at least a part of the message, using the second frequency band.

According to certain embodiments, an electronic device comprises at least one processor; and a memory operatively connected with the processor and storing a first application program. The memory stores instructions that, when executed by the at least one processor, cause the electronic device to: provide a first network interface using a first frequency band and a first packet data network (PDN) session having a first attribute and a second network interface using a second frequency band and a second PDN session having a second attribute that is different from the first attribute; select one of the first network interface and the second network interface, based on characteristics of data related to the first application program; and communicate data related to the first application program with a first core network using the selected interface, wherein the first attribute indicates a connection with the first core network only through the first BS, and the second attribute indicates a capability of a connection with the first core network through the first BS or the second BS.

According to certain embodiments, an electronic device comprises a housing; a wireless communication circuit arranged in the housing; at least one processor operatively connected with the wireless communication circuit; and a memory operatively connected with the at least one processor, wherein the memory stores instructions that, when executed by the at least one processor, are configured to cause the electronic device to: detect an event configured for establishment of at least one packet data network (PDN) session; configure an attribute of the at least one PDN session related to a bearer type available to each of the at least one PDN session; transmit a connectivity request for each of the at least one PDN session having the configured attribute of the at least one PDN session to an external electronic device through the wireless communication circuit; and establish the at least one PDN session having each of the configured attribute of the at least one PDN session.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 1 is a block diagram illustrating an electronic device in a network environment according to certain embodiments;

Throughout the drawings, like reference numerals will be understood to refer to like parts, components, and structures.

DETAILED DESCRIPTION

Figure 2A:
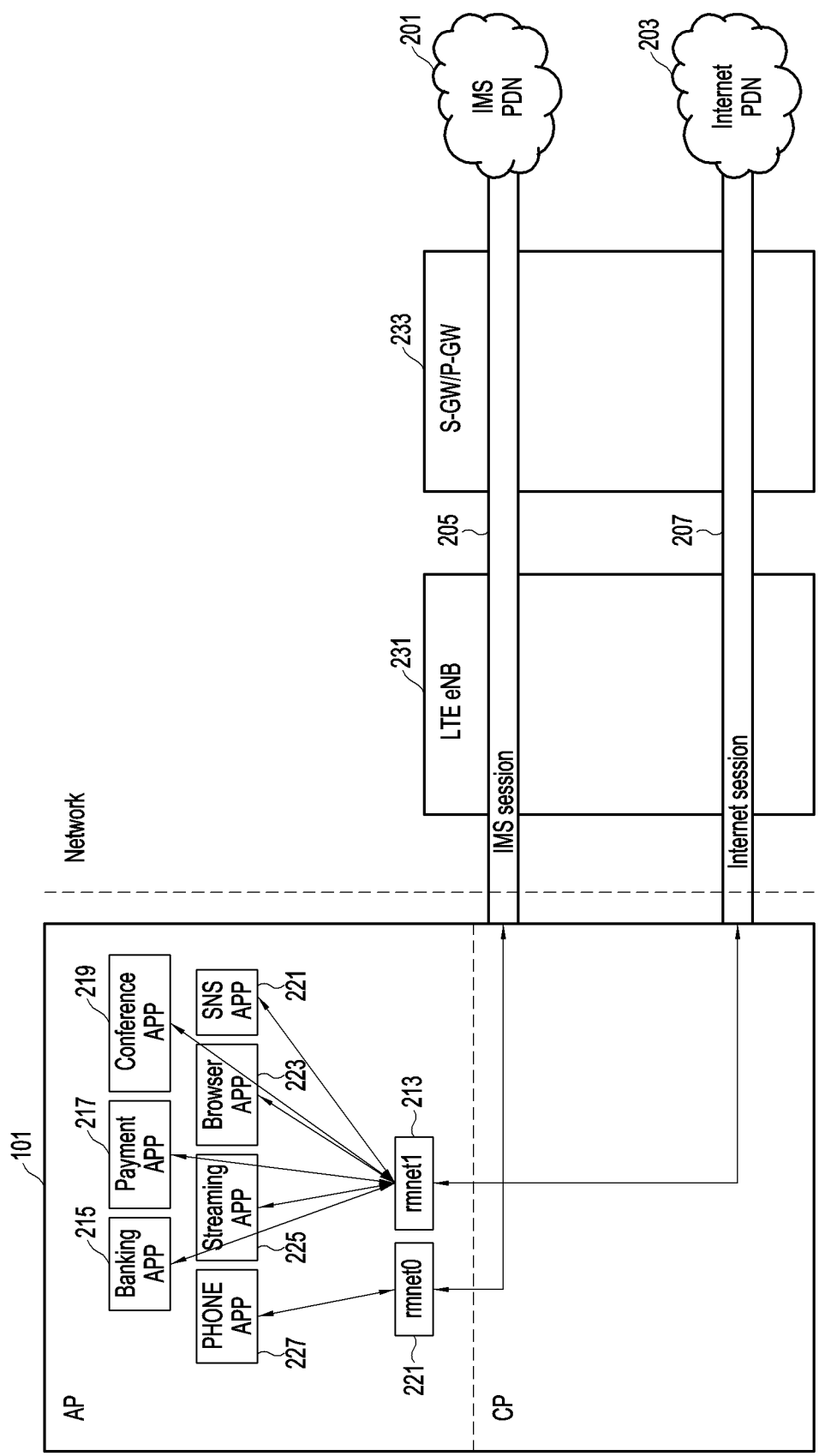
FIGS. 2A and 2B are diagrams for describing management of a public data network (PDN) session, according to comparative examples.

In a mobile communication system, an Internet protocol (IP) multimedia subsystem (IMS) session and an Internet session are generally managed. An IP address of an electronic device is allocated to each session, and applications installed in the electronic device may transmit and receive data by using a session. For example, an application supporting voice communication may process data through IMS session connection, and any application that is different from the application supporting voice communication may process data through Internet session connection.

In a $5^{th}$-Generation (5G) non-standalone system, especially, in evolved universal mobile telecommunications system (E-UTRAN) new radio dual connectivity (EN-DC) where a long term evolution (LTE) cell becomes a master node (MN), the Internet session may be connected through a new radio (NR) cell when the NR cell is added. A bearer may be used to determine a data transmission and reception path, and there may be three possible bearer types in the 5G non-standalone system. More specifically, there may be a master cell group (MCG) bearer that is a passage through which data is exchanged through the LTE cell, a secondary cell group (SCG) bearer that is a passage through which data is exchanged through the NR cell, and a split bearer that is a passage capable of using both the LTE cell and the NR cell. Thus, a cell used by an electronic device may be determined according to a bearer used between the electronic device and a network.

In the 5G non-standalone system, especially, in the EN-DC where the LTE cell becomes a master node, the Internet session may use all of the MCG bearer, the SCG bearer, and the split bearer, and when the NR cell is added, the electronic device may transmit and receive data by using the NR cell.

Different applications installed in the electronic device have different characteristics. For example, a banking application may require stability and while a streaming application requires high transmission speeds. If an internet session that trades off stability for a higher transmission speed, the internet session may not be appropriate for the banking application. In contrast, if the Internet session has stability at the expense of transmission, the streaming application may not have adequate quality.

Certain embodiments may solve some of the foregoing problems or other problems, and may provide an electronic device that creates a plurality of Internet sessions for which available bearers are differently configured and selects an Internet session according to characteristics of an application, and an operation method of the electronic device. Moreover, there are also provided an electronic device capable of self-selecting a type of an available bearer and an operation method of the electronic device.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132 and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" shall be understood to include one processor or more than one processor acting together.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2B:
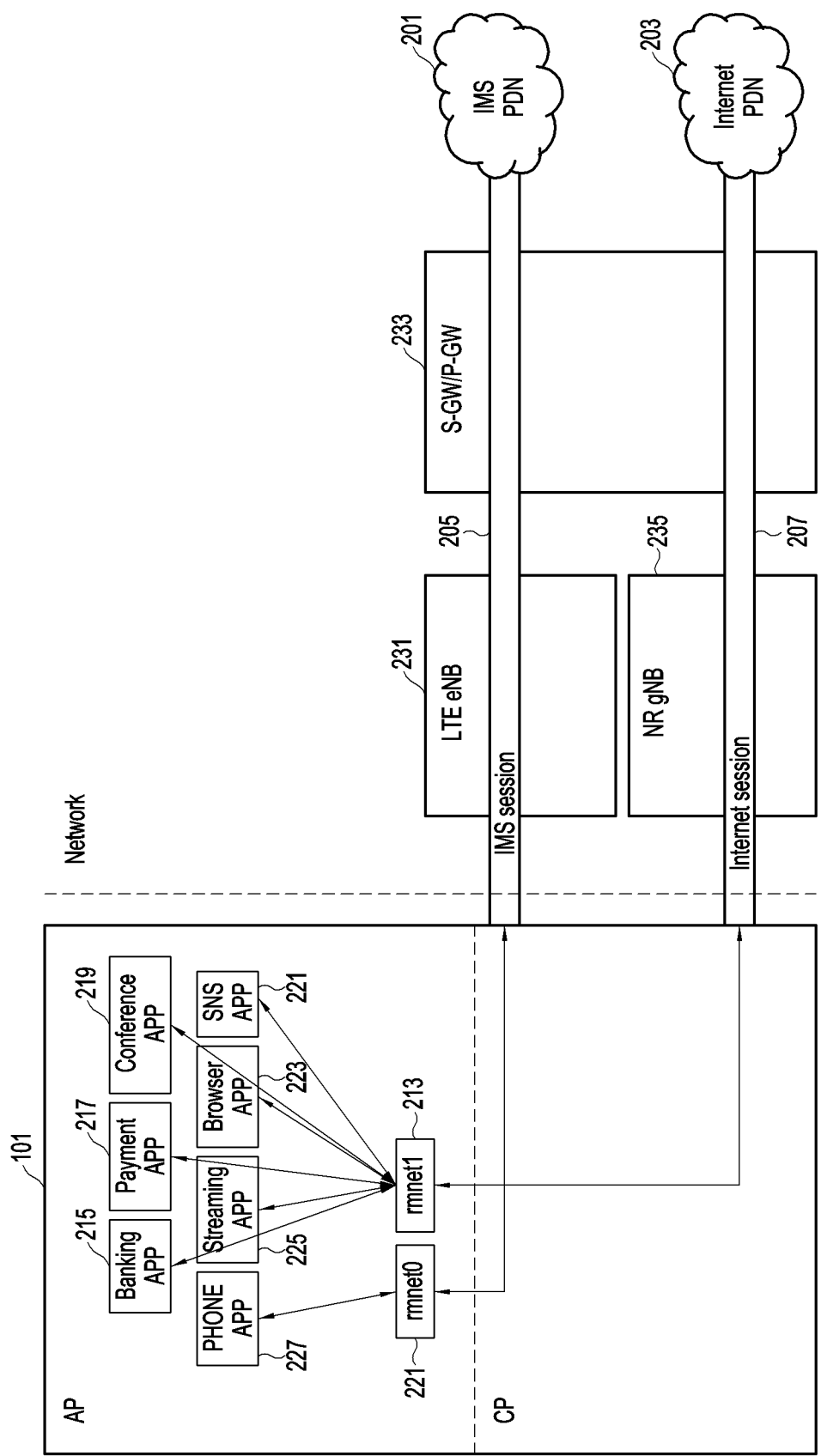

FIGS. 2A and 2B are diagrams for describing management of a public data network (PDN) session, according to comparative examples. The electronic device 101 includes a plurality of applications. The plurality of applications can include a phone app 227, a streaming app 225, and a banking app 215, among others. The phone app can be characterized as transmitting relatively small amounts of data, since voice can be reliably represented by as little as 64 kbps. However, excessive network delay between transmission of voice signals will make a voice conversation unintelligible. The streaming app 225, particular multimedia including audio and high definition video, may require higher transmission speeds than for the phone app, but may tolerate lower latency. The banking app 215 may not transmit as much data as the streaming app 225, and may not require the low latency of the phone app 227, but may not tolerate an interrupted session.

As shown in FIG. 2A, in an LTE environment, an electronic device 101 according to comparative examples may manage an Internet protocol (IP) multimedia subsystem (IMS) session 205 and an Internet session 207.

The electronic device 101 may be connected with an IMS public data network (PDN) 201 through an LTE base station (BS) or LTE evolved NB (eNB) 231 and a serving gateway (S-GW)/packet data network gateway (P-GW) 233, by using the IMS session 205.

The electronic device 101 may be connected with an Internet PDN 203 through the LTE eNB 231 and the S-GW/P-GW 233, by using the Internet session 207. An IP address of the electronic device 101 may be allocated to each IMS session 205 and each Internet session 207.

Interfaces such as rmnet0 211 and rmnet1 213 may be generated to allow applications executed in the electronic device 101 to use the IMS session 205 or the Internet session 207. As examples of the interfaces, rmnet0 and rmnet1 of an Android operating system (OS) have been used, but this is merely an example, and it would be easily understood by those of ordinary skill in the art that certain embodiments are not limited to a type of an OS. For example, the electronic device 101 may process traffic generated in a phone application (PHONE APP) 227 supporting voice over LTE (VoLTE) by using the IMS session 205. The electronic device 101 may process traffic generated in applications 215, 217, 219, 221, 223, and 225 except for the PHONE APP 227 by using the Internet session 207. In an example, an application processor (AP) 251 may be the main processor 121 of FIG. 1, and a communication processor (CP) 253 may be the wireless communication module 192 of FIG. 1. The applications 215, 217, 219, 221, 223, and 225 installed in the electronic device 101 may operate by the AP 251.

As illustrated in FIG. 2B, in a multi radio access technology (RAT) dual connectivity (MR-DC) environment, the electronic device 101 according to comparative examples may manage the IMS session 205 and the Internet session 207.

The MR-DC environment may mean an environment where heterogeneous dual connectivity such as LTE ($4^{th}$-Generation: 4G) and NR (5G). In an example, there may be E-UTRAN new radio dual connectivity (EN-DC) in which the LTE eNB 231 operates as a master node and an NR base station (BS) or NR gNB 235 operates as a secondary node. In the MR-DC environment according to certain embodiments, an NR gNB may operate as a master node, and an LTE eNB may operate as a secondary node.

The electronic device 101 may be connected with the IMS PDN 201 through the LTE eNB 231 and the S-GW/P-GW 233, by using the IMS session 205. The electronic device 101 may be connected with the Internet PDN 203 through the NR gNB 235 and the S-GW/P-GW 233, by using the Internet session 207.

An IP address of the electronic device 101 may be allocated to each IMS session 205 and each Internet session 207. The interfaces such as rmnet0 211 and rmnet1 213 may be generated to allow applications executed in the electronic device 101 to use the IMS session 205 or the Internet session 207. For example, the electronic device 101 may process traffic generated in the PHONE APP 227 supporting VoLTE by using the IMS session 205. The electronic device 101 may process traffic generated in applications 215, 217, 219, 221, 223, and 225 except for the PHONE APP 227 by using the Internet session 207. According to comparative examples, regardless of a type of an application (e.g., an application putting emphasis on stability over processing speed), all traffic generated in the applications 215, 217, 219, 221, 223, and 225 may be processed through the Internet session 207.

Figure 2C:
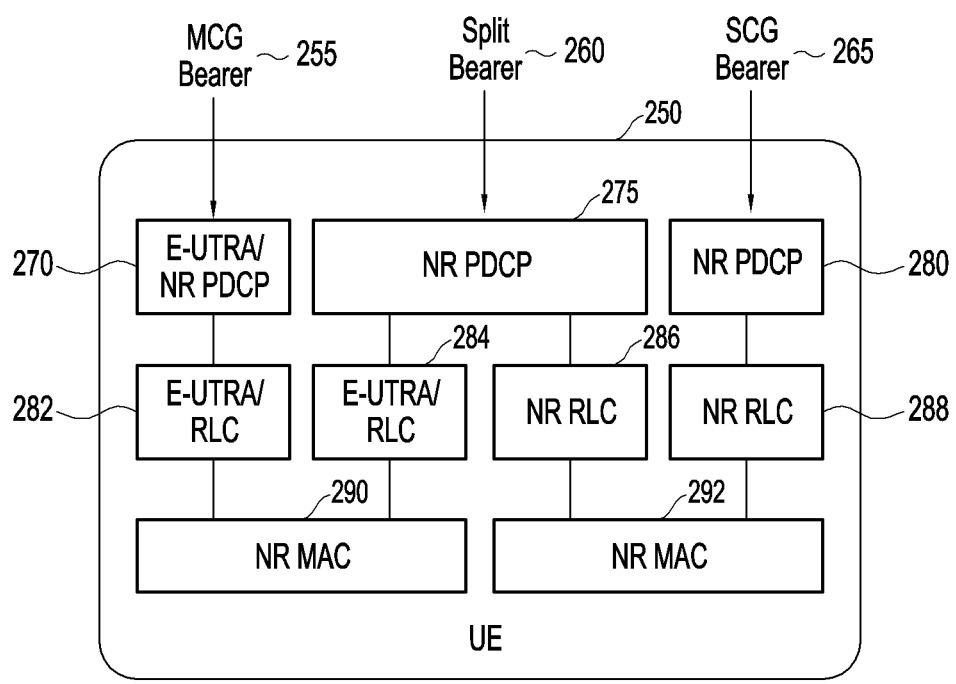
FIG. 2C is a diagram describing user equipment (UE) receiving signals over a different bearers according to various embodiments.

FIG. 2C is a diagram describing user equipment (UE) 250 (such as an electronic device 101) receiving signals over a different bearers. The user equipment 250 can uses a master cell group bearer (MCG) 255, a secondary cell group (SCG) bearer 265, and a split bearer 260.

The MCG bearer 255 is a passage through which data is exchanged through an LTE cell. The SCG bearer 265 is a passage through which data is exchanged through an NR cell. The split bearer 260 is a passage capable of using both the LTE cell and the NR cell.

The MCG bearer 255 proceeds through a E-UTRA/NR PDCP module 270, a E-UTRA/RLC module 284 to the NR MAC 290. The SCG bearer 265 proceeds through the NR PDCP module 280, an NR RLC 288, to a NR MAC module 292. The split bearer 260 proceeds through an NR PDCP 275 module to an E-UTRA/RLC 284 module and/or NR RLC 286 module to either NR MAC module 290 or NR MAC module 292.

Figure 3:
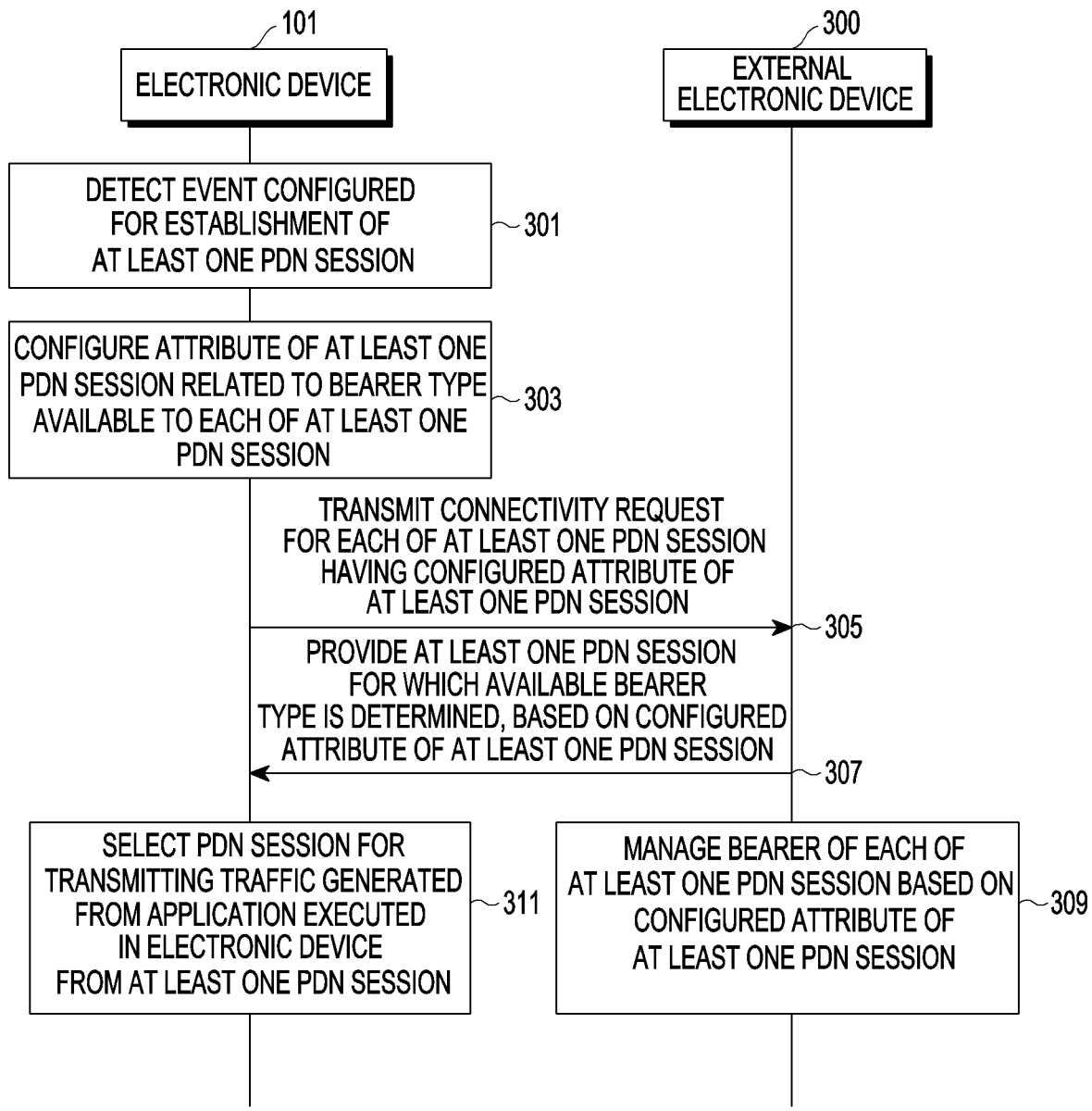
FIG. 3 is a sequence diagram for describing a bearer management method according to certain embodiments.
Figure 4A:
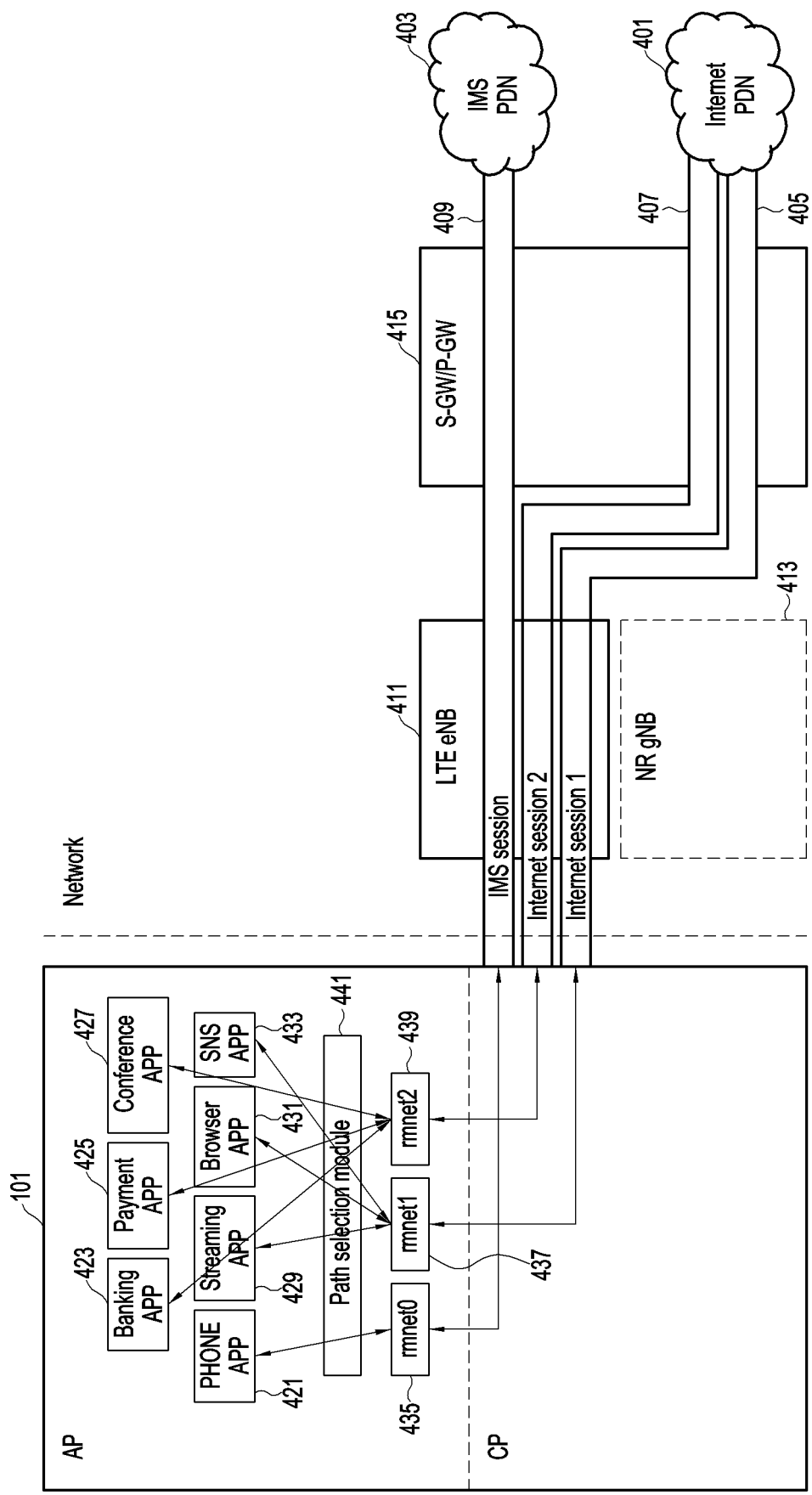
FIGS. 4A and 4B are diagrams for describing attributes of a PDN session according to certain embodiments.
Figure 4B:
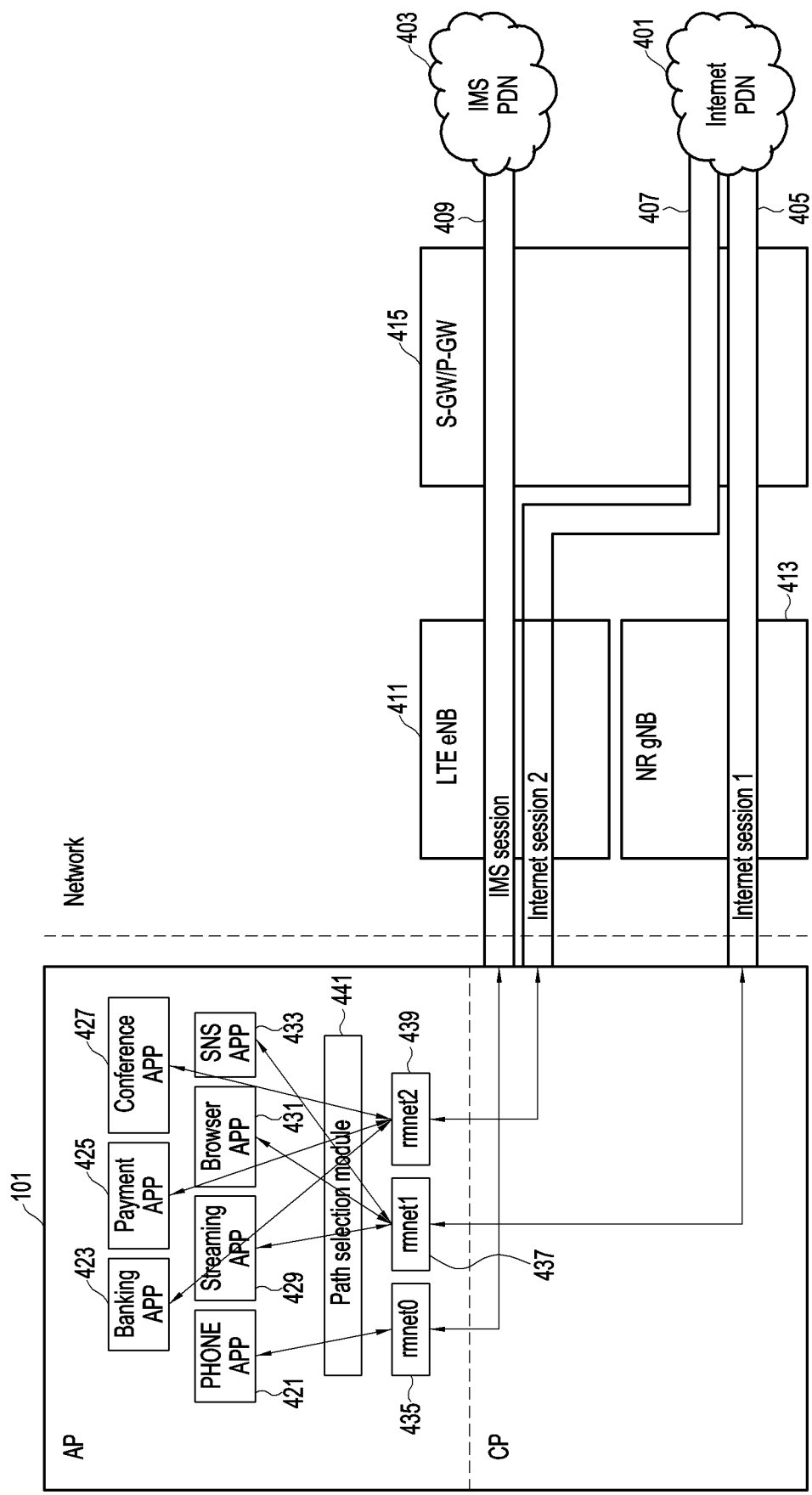

FIG. 3 is a sequence diagram for describing a bearer management method according to certain embodiments. FIGS. 4A and 4B are diagrams for describing attributes of a PDN session according to certain embodiments.

Referring to FIG. 3, according to certain embodiments, the electronic device 101 (e.g., the processor 120 of FIG. 1) may detect an event configured for establishment of at least one PDN session in operation 301. For example, the event configured for establishment of the PDN session may be a network connection event. The event configured for establishment of the PDN session may be an event for transmitting a PDN connectivity request to an external electronic device 300 from the electronic device 101.

According to certain embodiments, in operation 303, may select a bearer. The electronic device 101 may configure an attribute of the at least one PDN session related to a bearer type available to each of the at least one PDN session. Configuring the attribute of the PDN session may include configuring the PDN session to use a master cell group (MCG) bearer or the PDN session to use any one of the MCG bearer, a secondary cell group (SCG) bearer, or a split bearer. For example, the attribute of the PDN session may indicate a bearer type available to the PDN session. When the PDN session uses the MCG bearer, it may mean that the PDN session uses a master cell even when a secondary cell is available. When the PDN session uses any one of the MCG bearer, the SCG bearer, or the split bearer, it may mean that the PDN session uses the master cell when the secondary cell is not connected, and the PDN session uses the secondary cell when the secondary cell is connected.

For example, the electronic device 101 may configure a first PDN session to use the MCG bearer and a second PDN session to use any one of the MCG bearer, the SCG bearer, or the split bearer.

For example, when determining that both the electronic device 101 and the external electronic device 300 (e.g., a first cellular network 1292 of FIG. 12) are capable of performing an EN-DC operation, the electronic device 101 may configure the second PDN session to use the MCG bearer and the first PDN session to use any one of the SCG bearer, the MCG bearer, or the split bearer. When the electronic device 101 transmits an attach request in which a DCNR bit is set to 1 among "UE Network Capability" information elements (IEs) and receives an attach accept in which an RestrictDCNR bit is set to 0 among "evolved packet system (EPS) Network Feature Support" IEs in response to the attach request, then the electronic device 101 may determine that both the electronic device 101 and the external electronic device 300 are capable of performing the EN-DC operation. When receiving a message indicating that the external electronic device 300 is connected with another external electronic device (e.g., a second cellular network 1294 of FIG. 12) from the external electronic device 300, the electronic device 101 may configure the second PDN session to use the MCG bearer and the first PDN session to use any one of the SCG bearer, the MCG bearer, or the split bearer.

For example, the electronic device 101 may configure, based on a type of a bearer used in the applications installed in the electronic device 101, the second PDN session to use the MCG bearer and the first PDN session to use any one of the MCG bearer, the SCG bearer, or the split bearer. The type of the bearer used in the applications may be set by a manufacturer of each application or a user of the electronic device 101. Alternatively, the electronic device 101 may set a type of a bearer used by each application according to characteristics of the application. For example, the electronic device 101 may set the type of the bearer such that an application requiring stability uses the MCG bearer.

According to certain embodiments, the electronic device 101 may transmit a connectivity request of each of the at least one PDN session having the configured attribute in operation 305.

For example, the electronic device 101 may transmit a session connectivity request including access point name (APN) information corresponding to the configured attribute of the PDN session to the eternal electronic device 300. In EN-DC, the electronic device 101 may transmit a PDN connectivity request including the APN information or an EPS session management (ESM) information response including the APN information to the external electronic device 300. The electronic device 101 and the external electronic device 300 may previously store information about a bearer type available for each APN. For example, APN 1 (e.g., lte.AA.com) may use the MCG bearer, and APN 2 (e.g., 5g.AA.com) may use all of the MCG bearer, the SCG bearer, and the split bearer. For example, the electronic device 101 may transmit a session connectivity request including address information related to a PDN-gateway (P-GW). The electronic device 101 and the external electronic device 300 may previously store information about a bearer type available for each P-GW. For MR-DC in which an NR gNB operates as a master node, the external electronic device 300 may be an NR gNB (e.g., the second cellular network 1294 of FIG. 12), and the electronic device 101 may transmit a PDU session establishment request including data network name (DNN) information to the external electronic device 300.

For example, the electronic device 101 may transmit a PDN session connectivity request including an indicator indicating an attribute of a PDN session to the external electronic device 300. For EN-DC, the electronic device 101 may transmit a PDN connectivity request or an ESM information response including an indicator indicating a bearer type available to a PDN session to an external electronic device (e.g., an LTE eNB). The indicator may be included in a reserved field of an existing PDN connectivity request or ESM information response, or a field for defining the indicator may be prescribed. For MR-DC where the NR gNB operates as a master node, the electronic device 101 may transmit a PDN session establishment request including an indicator indicating a bearer type available to a PDN session to an external electronic device (e.g., the NR gNB).

According to certain embodiments, in operation 307, the external electronic device 300 may provide at least one PDN session for which an available bearer type is determined, based on the configured attribute of the at least one PDN session. For example, the external electronic device 300 may be an LTE eNB for EN-DC, and the external electronic device 300 may be an NR gNB for MR-DC.

For example, as shown in FIGS. 4A and 4B, an LTE eNB 411 may provide a first PDN session (Internet session 1) 405 and a second PDN session (Internet session 2) 407 connected with an Internet PDN 401. The first PDN session 405 may be configured to use any one of the MCG bearer, the SCG bearer, and the split bearer, and the second PDN session 407 may be used configured to use the MCG bearer.

In FIG. 4A, it is assumed that the electronic device 101 operates in EN-DC and is not connected with an NR gNB 413. The electronic device 101 is not connected with the NR gNB 413, such that a first PDN session 405 and a second PDN session 407 may be connected with an Internet PDN 401 through an LTE eNB 411 and an S-GW/P-GW 415 and use the MCG bearer. According to certain embodiments, the LTE eNB 411 may provide an IMS session 409 connected with an IMS PDN 403. The IMS session 409 may be configured to use the MCG bearer, and thus may be connected with the IMS PDN 403 through the LTE eNB 411 and the S-GW/P-GW 415.

According to certain embodiments, an external electronic device (e.g., the first cellular network 1292 of FIG. 12) may manage a bearer of each of the at least one PDN session based on the configured attribute of the at least one PDN session, in operation 309. For example, based on information included in the session connectivity request received from the electronic device 101 (e.g., APN information or DNN information received in operation 305), the external electronic device may manage a bearer type available to the generated at least one PDN session. When the attribute of the first PDN session is configured by the electronic device 101 to allow use of the MCG bearer, the SCG bearer, and the split bearer for EN-DC, the external electronic device 300 may use the SCG bearer or the split bearer when a secondary node (e.g., an NR gNB) is added. When the attribute of the second PDN session is configured by the electronic device 101 to allow use of the MCG bearer, the external electronic device 300 may use the MCG bearer when the secondary node is added.

According to certain embodiments, the electronic device 101 may select a PDN session for transmitting traffic generated in an application executed in the electronic device 101 from the at least one PDN session, in operation 311. For example, the electronic device 101 may generate at least one interface connected to each of the at least one PDN session to identify the session. The electronic device 101 may select a PDN session in which traffic generated in an application is transmitted, based on information about a bearer type included in an application programming interface (API) provided in an application OS (e.g., Android). When an explicit policy for a bearer type exists in an application, the electronic device 101 may allow the application to use an interface corresponding to the policy. For example, the policy for the bearer type may be configured as related information in installation of the application, configured by a user's input, or updated from an external server. The electronic device 101 may allow the application to use the corresponding interface based on an attribute for requirements such as data throughput, stability, mobility, and low-latency of the application.

For example, as shown in FIG. 4B, it is assumed that PHONE APP 421, banking APP 423, payment APP 425, call APP 427, streaming APP 429, browser APP 431, and social network service (SNS) APP 433 are installed in the electronic device 101, and the electronic device 101 operates in EN-DC and is connected with the NR gNB 413. For example, the PHONE APP 421 may be an application related to IMS, the call APP 427 may be an application such as a video call, a conference call, etc., and the streaming APP 429 may be a live video play application.

The attributes of each application may be as shown in Table 1. Table 1 is merely an example, such that an attribute as well as high data throughput, stability, mobility, and low-latency may exist, and one attribute may be divided into several levels (e.g., high/mid/low).

Table 1 shows a chart of application and specific attributes that may be more important than others. Table 1 also uses an MCG bearer using LTE and an SCG bearer/split bearer using both LTE and NR in EN-DC as examples.

For example, a streaming application may place importance on data throughput and low-latency, as compared to stability and mobility. A payment application or banking application may place particular importance on stability, over throughput, mobility, and low-latency. A voice application may place particular importance on mobility compared to data throughput, stability, and low latency.

TABLE 1

| APP | Attribute | | | | Bearer |
|---|---|---|---|---|---|
| | Data Throughput | Stability | Mobility | Low-Latency | |
| Streaming | x | — | — | x | SCG/Split bearer |
| SNS | — | — | — | — | SCG/Split bearer |
| Browser | — | — | — | — | SCG/Split bearer |
| Payment | — | x | — | — | MCG bearer |
| call | — | — | x | — | MCG bearer |
| Banking | — | x | — | — | MCG bearer |

Referring to Table 1, the attributes of the banking APP 423, the payment APP 425, and the conference APP 427 indicate stability or mobility (e.g., attributes requiring stability or mobility), such that the electronic device 101 may select the second PDN session 407 using the MCG bearer as a PDN session for transmitting traffic generated in the banking APP 423, the payment APP 425, and the call APP 427. For example, the electronic device 101 may cause the banking APP 423 to use an interface rmnet2 439 corresponding to the second PDN session 407. The attributes of the streaming APP 429, the browser APP 431, and the SNS APP 433 indicate high data throughput or low latency (e.g., attributes requiring high data throughput or low latency), such that the electronic device 101 may select the first PDN session 405 using both the SCG bearer and the split bearer as a PDN session for transmitting traffic generated in the streaming APP 429, the browser APP 431, and the SNS APP 433. For example, the electronic device 101 may cause the streaming APP 429 to use an interface rmnet1 437 corresponding to the first PDN session 405. According to certain embodiments, the PHONE APP (e.g., VoLTE) 421 may be configured to use the IMS session 409, and the electronic device 101 may cause the PHONE APP 421 to use an interface rmnet0 435 corresponding to the IMS session 409. According to certain embodiments, to select an interface corresponding to each of a plurality of applications, the electronic device 101 may include a path selection module 441.

Figure 5:
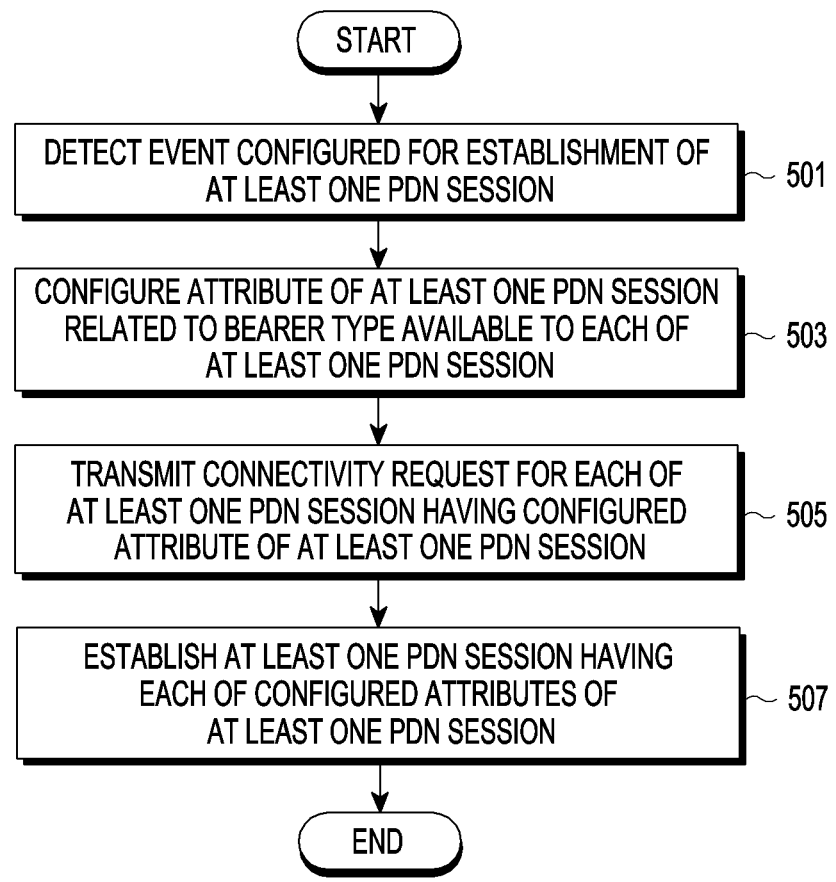
FIG. 5 is a flowchart for describing a method of connecting a PDN session according to certain embodiments.

FIG. 5 is a flowchart for describing a method of connecting a PDN session according to certain embodiments.

Referring to FIG. 5, according to certain embodiments, the electronic device 101 (e.g., the processor 120 of FIG. 1) may detect an event configured for establishment of at least one PDN session in operation 501. For example, the event configured for establishment of the PDN session may be a network connection event. The event configured for establishment of the PDN session may be an event for transmitting a PDN connectivity request to an external electronic device 300 from the electronic device 101.

According to certain embodiments, in operation 503, the electronic device 101 may configure an attribute of the at least one PDN session related to a bearer type available to each of the at least one PDN session. Configuring the attribute of the PDN session may including configuring the PDN session to use an MCG bearer or the PDN session to use any one of the MCG bearer, an SCG bearer, or a split bearer. When the PDN session uses the MCG bearer, it may mean that the PDN session uses a master cell even when a secondary cell is connected. When the PDN session uses any one of the MCG bearer, the SCG bearer, or the split bearer, it may mean that the PDN session uses the master cell when the secondary cell is not connected, and the PDN session uses the secondary cell when the secondary cell is connected.

For example, in EN-DC, when the PDN session uses the MCG bearer, it may mean that the PDN session uses LTE regardless of addition of the NR gNB. In EN-DC, when the PDN session uses any one of the MCG bearer, the SCG bearer, and the split bearer, it may mean that the PDN session uses NR by using the SCG bearer or the split bearer upon addition of the NR gNB. The SCG bearer and the split bearer may be classified as a bearer operating at FR1 (450-6000 MHz) and a bearer operating at FR2 (24250-52600 MHz), and an attribute based on a bearer type may be as provided below.

Table 2 is table showing each bearer in the rows, and an indication of the attributes, listed as columns, and whether the respective attribute is low, medium, or high.

TABLE 2

| Bearer type | Attribute | | | |
|---|---|---|---|---|
| | Data Throughput | Stability | Mobility | Low-Latency |
| MCG bearer in EN-DC | Low | High | High | Low (higher latency) |
| SCG/Split bearer in EN-DC with FR1 | Mid | Mid | Mid | Mid |
| SCG/Split bearer in EN-DC with FR2 | High | Low | Low | High (Lower Latency) |

Referring to Table 2, for example, data throughput and low latency may indicate an attribute of high data throughput per unit time. An application requiring fast data processing may use the SCG/split bearer having an attribute of high data throughput.

For example, a BS to which the electronic device 101 is connected may be handed over due to movement of a user having the electronic device 101, and when a handover occurs, stability may be lower than when connection with a single BS is maintained. Thus, an application requiring stability or mobility in the case of bearers have the attributes as designated in Table 2 may use the MCG bearer maintaining connection with an LTE eNB having a broader coverage even when the application is capable of being connected with the NR gNB.

According to certain embodiments, the electronic device 101 may transmit a connectivity request of each of the at least one PDN session having the configured attribute in operation 505.

For EN-DC, the electronic device 101 may transmit a PDN connectivity request to an external electronic device (e.g., the LTE eNB) for session connection, in which the PDN connectivity request may include information as provided in Table 3. For example, the electronic device 101 may transmit configured attribute information of a PDN session by adding it to any one of the information included in Table 3 (e.g., protocol configuration options).

TABLE 3

■ Table 8.3.20.1: PDN CONNECTIVITY REQUEST message content

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | PDN connectivity request message identity | Message type 9.8 | M | V | 1 |
|  | Request type | Request type 9.9.4.14 | M | V | ½ |
|  | PDN type | PDN type 9.9.4.10 | M | V | ½ |
| D | ESM information transfer flag | ESM information transfer flag 9.9.4.5 | O | TV | 1 |
| 28 | Access point name | Access point name 9.9.4.1 | O | TLV | 3-102 |
| 27 | Protocol configuration options | Protocol configuration options 9.9.4.11 | O | TLV | 3-253 |
| C | Device properties | Device properties 9.9.2.0A | O | TV | 1 |
| 33 | NBIFOM container | NBIFOM container 9.9.4.19 | O | TLV | 3-257 |
| 66 | Header compression configuration | Header compression configuration 9.9.4.22 | O | TLV | 5-257 |
| 7B | Extended protocol configuration options | Extended protocol configuration options 9.9.4.26 | O | TLV-E | 4-65538 |

In another example, the electronic device 101 may further add an indicator indicating the configured attribute information of the PDN session to the PDN connectivity request in addition to the information of Table 3. The indicator indicating the attribute information may be specified in Table 4 as below.

TABLE 4

| Indicator | Description |
|---|---|
| 0000 | MCG only |
| 0001 | MCG and SCG |
| 0010 | MCG and Split |
| 0011 | MCG and SCG/Split |
| 0101 | MCG and SCG with FR1 |
| 0110 | MCG and Split with FR1 |
| 0111 | MCG and SCG/Split with FR1 |
| 1001 | MCG and SCG with FR2 |

TABLE 4-continued

| Indicator | Description |
|---|---|
| 1010 | MCG and Split with FR2 |
| 1011 | MCG and SCG/Split with FR2 |

For EN-DC, the electronic device 101 may transmit an ESM information response in response to a request from an external electronic device, in which the ESM information response may include information as provided in Table 5. For example, the electronic device 101 may transmit configured attribute information of the PDN session by adding it to any one of the information included in Table 5 (e.g., protocol configuration options). The electronic device 101 may further add an indicator indicating the configured attribute information of the PDN session to the ESM information response in addition to the information of Table 5.

TABLE 5

■ ESM INFORMATION RESPONSE message content

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | ESM information response message identity | Messagetype 9.8 | M | V | 1 |
| 28 | Access point name | Access point name 9.9.4.1 | O | TLV | 3-102 |
| 27 | Protocol configuration options | Protocol configuration options 9.9.4.11 | O | TLV | 3-253 |
| 7 | Extended protocol configuration options | Extended protocol configuration options 9.9.4.26 | O | TLV-E | 4-65538 |

For MR-DC where the NR gNB operates as a master node, the electronic device 101 may transmit a PDN session establishment request to an external electronic device (e.g., the NR gNB) for session connection, in which the PDN session establishment request may include information as provided in Table 6. For example, the electronic device 101 may transmit configured attribute information of the PDN session by adding it to any one of the information included in Table 6. The electronic device 101 may further add an indicator indicating the configured attribute information of the PDN session to the PDN connectivity request in addition to the information of Table 6.

TABLE 6

Table 8.3.1.1.1: PDU SESSION ESTABLISHMENT REQUEST message content

| IEI | Information Element | Type/Reference | Presence | Format | Length |
|---|---|---|---|---|---|
|  | Extended protocol discrimination | Extended protocol discrimination 9.2 | M | V | 1 |
|  | PDU session ID | PDU session identity 9.4 | M | V | 1 |
|  | PTI | Procedure transaction identity 9.6 | M | V | 1 |
|  | PDU SESSION ESTABLISHMENT REQUEST message identity | Message type 9.7 | M | V | 1 |
| 9 | PDU session type | PDU session type 9.10.4.8 | O | TV | 1 |
| A | SSC mode | SSC mode 9.10.4.12 | O | TV | 1 |

TABLE 6-continued

Table 8.3.1.1.1: PDU SESSION ESTABLISHMENT REQUEST message content

| IEI | Information Element | Type/Reference | Presence | Format | Length |
|-----|---------------------|----------------|----------|--------|--------|
| 28 | 5GSM capability | 5GSM capability 9.10.4.1 | O | TLV | 3-15 |
| 55 | Maximum number of supported packet filters | Maximum number of supported packet filters 9.10.4.11 | O | TV | 3 |
| TBD | SM PDU DN request container | SM PDU DN request container 9.10.4.11 | O | TBD | TBD |
| 7B | Extended protocol configuration options | Extended protocol configuration options 9.10.4.4 | O | TLV-E | 4-65538 |

Thus, the electronic device 101 may transmit information about the configured attribute of the PDN session by transmitting a connectivity request for connecting the PDN session.

According to certain embodiments, the electronic device 101 may establish at least one PDN session having each of configured attributes of the at least one PDN session, in operation 507.

According to certain embodiments, for EN-DC, the electronic device 101 may receive an activate default EPS bearer context request from an external electronic device (e.g., the LTE gNB) in response to a session connectivity request including the configured attribute information of the PDN session, in which the activate default EPS bearer context request may include information as provided in Table 7. For example, any one of the information included in Table 7 (e.g., protocol configuration options) may include a result with respect to session connectivity requested by the electronic device 101. Alternatively, a resource indicating the result with respect to the session connectivity request in addition to the information provided in Table 7 may be allocated to the activate default EPS bearer context request. For example, when the electronic device 101 may request connection with the first PDN session to which any one of the SCG bearer, the MCG bearer, and the split bearer is available and the second PDN session to which the MCG bearer is available, the electronic device 101 may receive a response indicating that both connection with the first PDN session and connection with the second PDN session are possible or a response indicating that connection with a part of the first PDN session or the second PDN session is possible.

TABLE 7

ACTIVATE DEFAULT EPS BEARER CONTEXT REQUEST message content

| IEI | Information Element | Type/Reference | Presence | Format | Length |
|-----|---------------------|----------------|----------|--------|--------|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | Activate default EPS bearer context request message identity | Message type 9.8 | M | V | 1 |
|  | EPS QoS | EPS quality of service 9.9.4.3 | M | LV | 2-14 |
|  | Access point name | Access point name 9.9.4.1 | M | LV | 2-101 |
|  | PDN address | PDN address 9.9.4.9 | M | LV | 6-14 |
| 5D | Transaction identifier | Transaction identifier 9.9.4.17 | O | TLV | 3-4 |
| 30 | Negotiated QoS | Quality of service 9.9.4.12 | O | TLV | 14-22 |
| 32 | Negotiated LLC SAPI | LLC service access point identifier 9.9.4.7 | O | TV | 2 |
| 8 | Radio priority | Radio priority 9.9.4.13 | O | TV | 1 |
| 34 | Packet flow identifier | Packet flow identifier 9.9.4.8 | O | TLV | 3 |
| 5E | APN-AMBR | APN aggregate maximum bit rate 9.9.4.2 | O | TLV | 4-8 |
| 58 | ESM cause | ESM cause 9.9.4.4 | O | TV | 2 |
| 27 | Protocol configuration options | Protocol configuration options 9.9.4.11 | O | TLV | 3-253 |
| B- | Connectivity type | Connectivity type 9.9.4.2A | O | TV | 1 |
| C- | WLAN offload indication | WLAN offfload acceptability 9.9.4.18 | O | TV | 1 |
| 33 | NBIFOM container | NBIFOM container 9.9.4.19 | O | TLV | 3-257 |

TABLE 7-continued

| | ACTIVATE DEFAULT EPS BEARER CONTEXT REQUEST message content | | | | |
|---|---|---|---|---|---|
| IEI | Information Element | Type/Reference | Presence | Format | Length |
| 66 | Header compression configuration | Header compression configuration 9.9.4.22 | O | TLV | 5-257 |
| 9- | Control plane only indication | Control plane only indication 9.9.4.23 | O | TV | 1 |
| 7B | Extended protocol configuration options | Extended protocol configuration options 9.9.4.26 | O | TLV-E | 4-65538 |
| 6E | Serving PLMN rate control | Serving PLMN rate control 9.9.4.28 | O | TLV | 4 |
| 5F | Extended APN-AMBR | Extended APN aggregate maximum bit rate 9.9.4.29 | O | TLV | 8 |

According to certain embodiments, for MR-DC where the NR gNB operates as a master node, the electronic device 101 may receive a PDU session establishment accept message from an external electronic device (e.g., the NR gNB) in response to the session connectivity request including the configured attribute information of the PDN session, in which the PDN session establishment accept message may include information as provided in Table 8. For example, any one of the information included in Table 8 may include a result with respect to session connection requested by the electronic device 101.

For example, when the electronic device 101 may request connection with the first PDN session to which any one of the SCG bearer, the MCG bearer, and the split bearer is available and the second PDN session to which the MCG bearer is available, the electronic device 101 may receive a response indicating that both connection with the first PDN session and connection with the second PDN session are possible or a response indicating that connection with a part of the first PDN session or the second PDN session is possible.

TABLE 8

| | Table 8.3.2.1.1: PDU SESSION ESTABLISHMENT ACCEPT message content | | | | |
|---|---|---|---|---|---|
| IEI | Information Element | Type/Reference | Presence | Format | Length |
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION ESTABLISHMENT ACCEPT message identity | Messsge type 9.7 | M | V | 1 |
| | Selected PDU session type | PDU session type 9.10.4.8 | M | V | ½ |
| | Selected SSC mode | SSC mode 9.10.4.12 | M | V | ½ |
| | DNN | DNN 9.10.3.19 | M | LV | 2-TBD |
| | Authorized QoS rules | QoS rules 9.10.4.9 | M | LV-E | 7-65538 |
| | Session AMBR | Session-AMBR 9.10.4.10 | M | LV | TBD |
| 59 | 5GSM cause | 5GSM cause 9.10.4.2 | O | TV | 2 |
| 29 | PDU address | PDU address 9.10.4.7 | O | TLV | 7, 11 or 15 |
| 56 | RQ timer value | GPRS timer 9.10.2.3 | O | TV | 2 |
| 22 | S-NSSAI | S-NSSAI 9.10.2.6 | O | TLV | 3-10 |
| 7F | Mapped EPS bearer contexts | Mapped EPS bearer contexts 9.10.4.6 | O | TLV-E | 7-65538 |
| 78 | EAP message | EAP message 9.10.2.2 | O | TLV-E | 7-1503 |
| 7B | Extended protocol configuration options | Extended protocol configuration options 9.10.4.4 | O | TLV-E | 4-65538 | electronic device 101. Alternatively, a resource indicating the result with respect to the session connectivity request in addition to the information provided in Table 8 may be allocated to the PDU session establishment accept message.

Operation 507 is described assuming a situation in which session connection is possible, but when session connection is not possible, a PDN connectivity reject message or a PDN session establishment reject message may be received. The PDN connectivity reject message may include information as provided in Table 9. For example, EMS cause may indicate a failure of session connection. Any one of the information in Table 9 (e.g., protocol configuration options) or an additionally allocated resource may indicate information about an attribute of a PDN session connectable between the electronic device 101 and the external electronic device. The PDN session establishment reject message may include information as provided in Table 10. For example, any one of the information in Table 10 or an additionally allocated resource may indicate information about an attribute of a PDN session connectable between the electronic device 101 and the external electronic device.

one PDN session in operation 601. Operation 601 may be operation 501 described above.

According to certain embodiments, in operation 603, the electronic device 101 may configure an attribute of the at least one PDN session related to a bearer type available to each of the at least one PDN session. Operation 603 may be operation 503 described above.

According to certain embodiments, in operation 605, the electronic device 101 may configure an attribute of the at least one PDN session related to a bearer type available to each of the at least one PDN session. Operation 605 may be operation 505 described above.

TABLE 9

■ PDN CONNECTIVITY REJECT message content

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity | M | V | ½ |
| | Procedure transaction identity | Procedure transaction identity 9.4 | M | V | 1 |
| | PDN connectivity reject message identity | Message type 9.8 | M | V | 1 |
| | ESM cause | ESM cause 9.9.4.4 | M | V | 1 |
| 27 | Protocol configuration options | Protocol configuration options 9.9.4.11 | O | TLV | 3-253 |
| 37 | Back-off timer value | GPRS timer 3 9.9.3.16B | O | TLV | 3 |
| 6B | Re-attempt indicator | Re-attempt indicator 9.9.4.13A | O | TLV | 3 |
| 33 | NBIFOM container | NBIFOM container 9.9.4.19 | O | TLV | 3-257 |
| 7B | Extended protocol configuration options | Extended protocol configuration options 9.9.4.26 | O | TLV-E | 4-65538 |

TABLE 10

Table 8.3.3.11: PDU SESSION ESTABLISHMENT REJECT message content

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION ESTABLISHMENT REJECT message identity | Message type 9.7 | M | V | 1 |
| | 5GSM cause | 5GSM cause 9.10.4.2 | M | V | 1 |
| 37 | Back-off timer value | GPRS timer 3 9.10.2.5 | O | TLV | 3 |
| F- | Allowed SSC mode | Allowed SSC mode 9.10.4.3 | O | TV | 1 |
| 78 | EAP message | EAP message 9.10.2.2 | O | TLV-E | 7-1503 |
| 7B | Extended protocol configuration options | Extended protocol configuration options 9.10.4.4 | O | TLV-E | 4-65538 |

Figure 6:
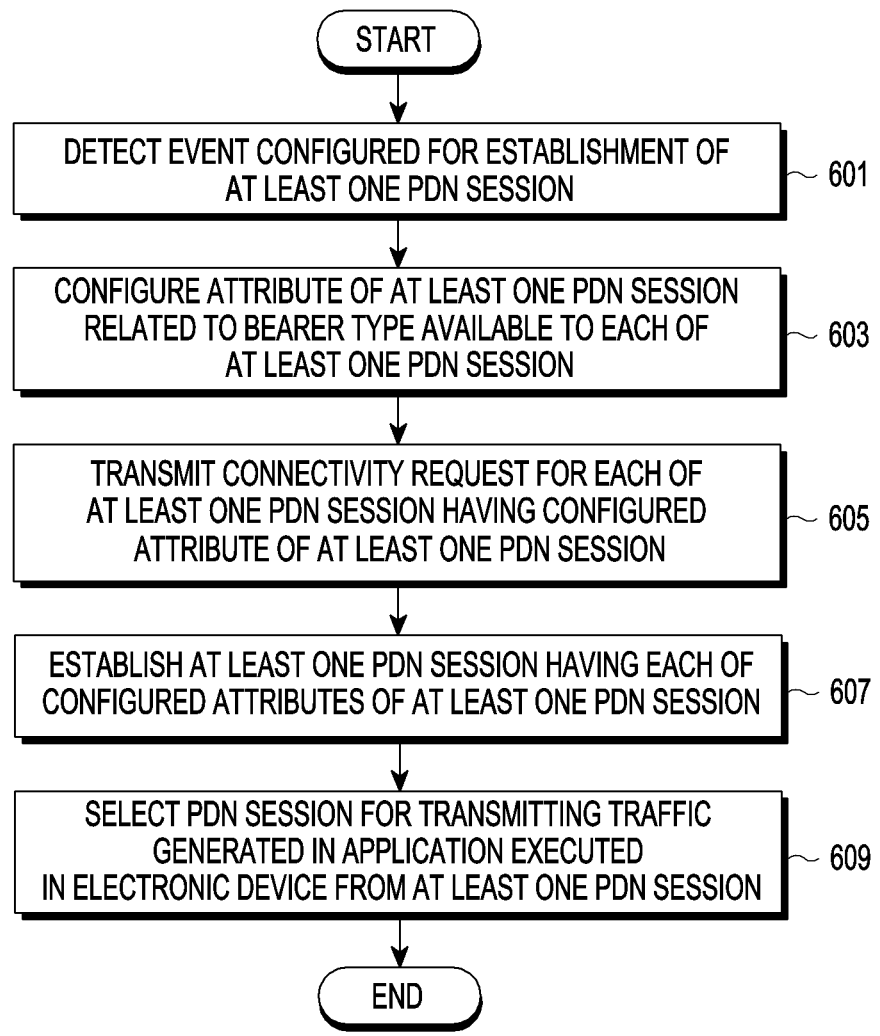
FIG. 6 is a flowchart for describing a method of selecting a PDN session according to certain embodiments.

FIG. 6 is a flowchart for describing a method of selecting a PDN session according to certain embodiments.

Referring to FIG. 6, according to certain embodiments, the electronic device 101 (e.g., the processor 120 of FIG. 1) may detect an event configured for establishment of at least According to certain embodiments, the electronic device 101 may establish at least one PDN session having each of configured attributes of the at least one PDN session, in operation 607. Operation 607 may be operation 507 described above.

According to certain embodiments, the electronic device 101 may select a PDN session for transmitting traffic generated in an application executed in the electronic device 101 from the at least one PDN session, in operation 609. The electronic device 101 may select the PDN session based on characteristics of the traffic generated in the application. For example, when traffic generated in an application (e.g., a payment application) needs to guarantee high stability, the electronic device 101 may select a session using the MCG bearer to use LTE in spite of NR connection. The electronic device 101 may determine characteristics of the traffic generated in the application based on at least one of the API, a policy, or attributes of the application.

Figure 7:
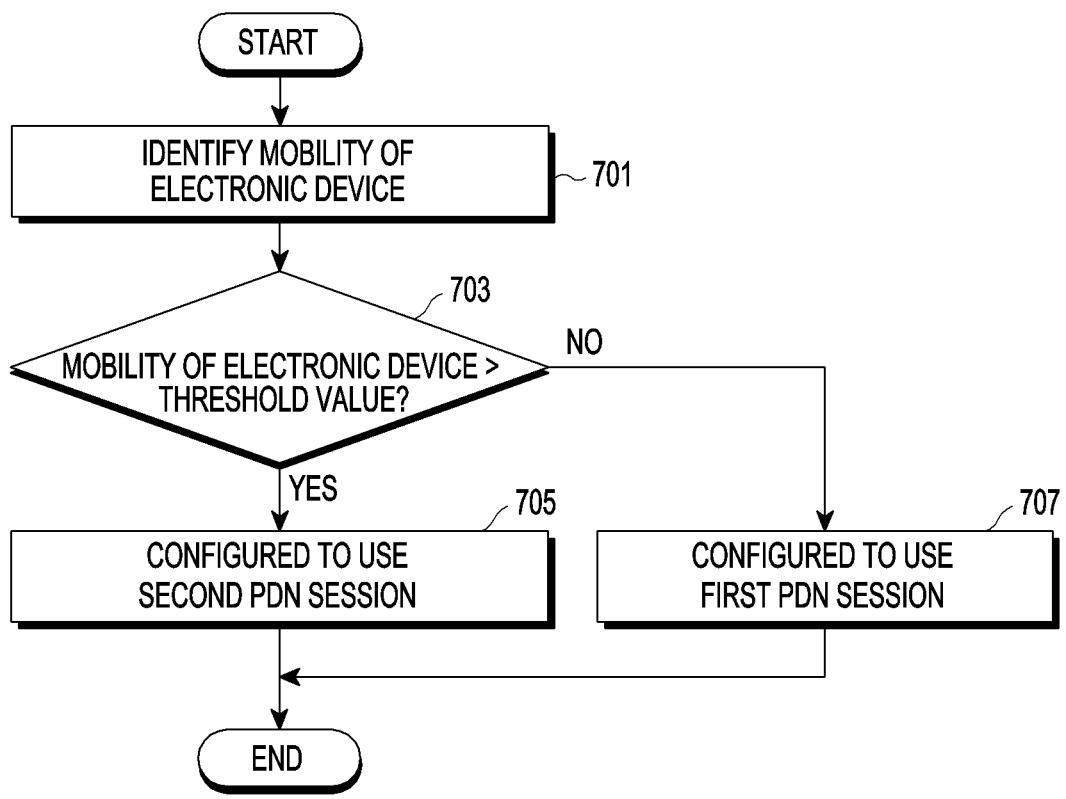
FIG. 7 is a flowchart for describing a method of selecting a PDN session according to certain embodiments.
Figure 8:
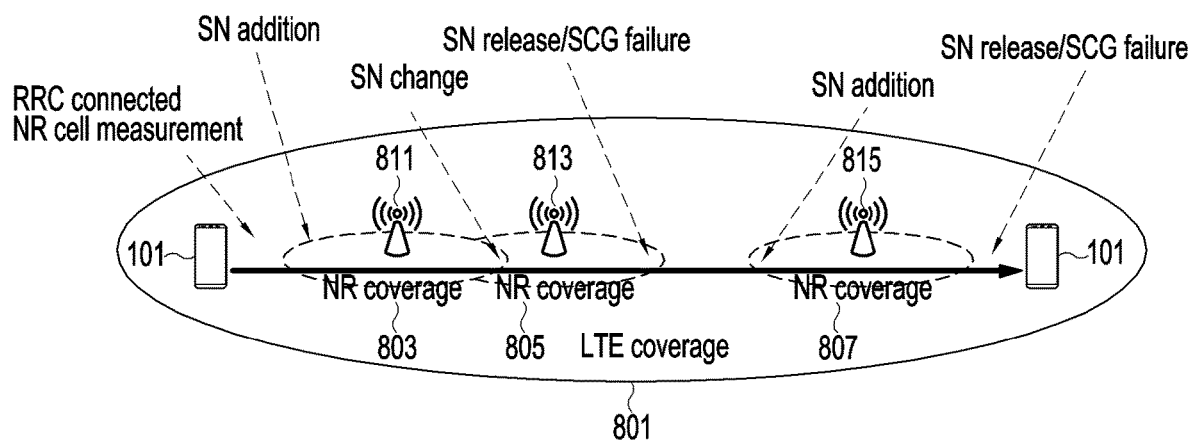
FIG. 8 is a diagram for describing a method of identifying mobility, according to certain embodiments.

FIG. 7 is a flowchart for describing a method of selecting a PDN session according to certain embodiments. FIG. 8 is a diagram for describing a method of identifying mobility, according to certain embodiments.

Referring to FIG. 7, according to certain embodiments, the electronic device 101 (e.g., the processor 120 of FIG. 1) may identify mobility of the electronic device 101, in operation 701. For example, the electronic device 101 may determine a moving speed thereof. The electronic device 101 may determine whether the electronic device 101 stays at a particular position for a threshold time or longer. Referring to FIG. 8, when the electronic device 101 stays at a particular position for a threshold time or longer, the electronic device 101 stays in any one of coverages 803, 805, and 807 of NR gNBs 811, 813, and 815 for the threshold time or longer.

According to certain embodiments, the electronic device 101 may determine whether mobility of the electronic device 101 exceeds a threshold value, in operation 703. For example, the electronic device 101 may determine that mobility thereof exceeds a threshold value, when the moving speed of the electronic device 101 exceeds a particular value. For example, when the electronic device 101 stays for a threshold time or shorter in any one of the coverages 803, 805, and 807 of the NR gNBs 811, 813, and 815, the electronic device 101 may determine that mobility thereof exceeds the threshold value.

According to certain embodiments, when determining that the mobility of the electronic device 101 exceeds the threshold value (yes), the electronic device 101 may be configured to use the second PDN session in operation 705. The second PDN session may be a PDN session configured to use the MCG bearer. For example, as shown in FIG. 8, while moving in an LTE coverage 801, the electronic device 101 may pass through a first NR coverage 803 of a first NR gNB 811, a second NR coverage 805 of a second NR gNB 813, and a third NR coverage 807 of a third NR gNB 815. When the electronic device 101 experiences addition, change, and release/failure of a secondary node while passing through a plurality of NR coverages, stability or accuracy of communication may be lowered. When the mobility of the electronic device 101 exceeds the threshold value, the electronic device 101 may be configured to use the second PDN session using LTE in spite of addition of the NR gNB.

According to certain embodiments, when determining that the mobility of the electronic device 101 does not exceed the threshold value (no), the electronic device 101 may be configured to use the first PDN session in operation 707. The first PDN session may be a PDN session configured to use the MCG bearer, the SCG bearer, and the split bearer. Referring to FIG. 8, when the electronic device 101 stays in the first NR coverage 803 for the threshold time or longer, the electronic device 101 may be configured to use the first PDN session.

Figure 9:
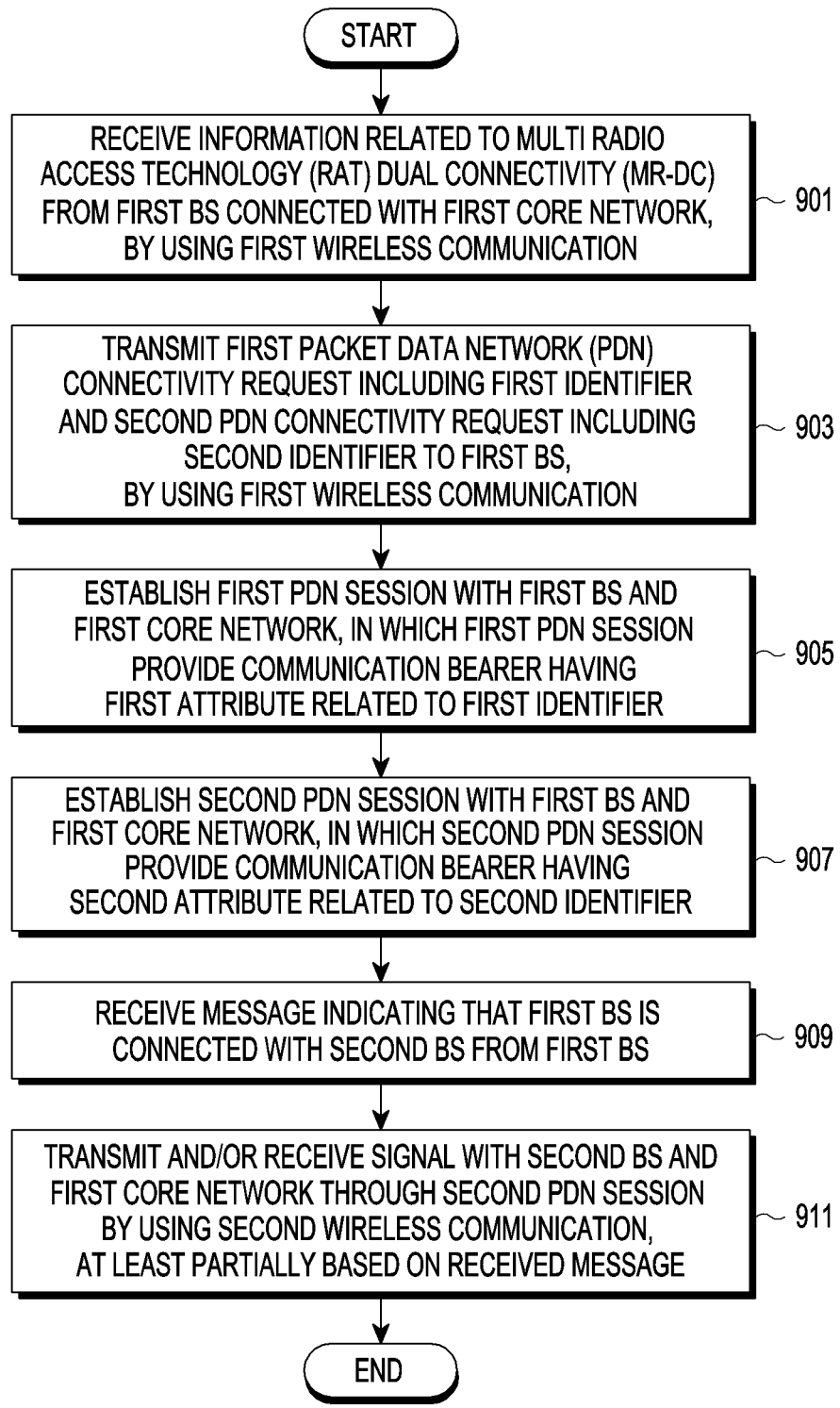
FIG. 9 is a flowchart for describing a method of connecting a PDN session according to certain embodiments.

FIG. 9 is a flowchart for describing a method of connecting a PDN session according to certain embodiments.

Referring to FIG. 9, according to certain embodiments, the electronic device 101 (e.g., the processor 120 of FIG. 1) may receive information related to MR-DC from a first BS connected with a first core network by using the first wireless communication, in operation 901. For example, the information related with MR-DC may be information indicating operability with MR-DC. In an EN-DC environment, the first BS may be an LTE eNB. In the EN-DC environment, the first core network may be an evolved packet core (EPC).

According to certain embodiments, the electronic device 101 may transmit a first packet data network (PDN) connectivity request including a first identifier and a second PDN connectivity request including a second identifier to the first BS by using first wireless communication, in operation 903. The first identifier and the second identifier may indicate information about a bearer type available to a PDN session. For example, the first identifier may include address information related to a P-GW that provides a first PDN session, and the second identifier may include address information related to a P-GW that provides a second PDN session. The address information related to the P-GW may include APN information. According to certain embodiments, the first identifier and the second identifier may be stored in a memory (e.g., the memory 130 of FIG. 1) of the electronic device 101.

According to certain embodiments, in operation 905, the electronic device 101 may establish the first PDN session with the first BS and the first core network, in which the first PDN session may provide a communication bearer having a first attribute related to the first identifier. For example, in EN-DC, the first PDN session may provide an MCG bearer. In the EN-DC environment, the first PDN session may provide a bearer having an attribute of being connected with the EPC through the LTE eNB.

According to certain embodiments, in operation 907, the electronic device 101 may establish the second PDN session with the first BS and the first core network, in which the second PDN session may provide a communication bearer having a second attribute related to the second identifier. For example, in EN-DC, the second PDN session may provide the MCG bearer, the SCG bearer, and the split bearer. In the EN-DC environment, the second PDN session may provide the SCG bearer and the split bearer connectable with the EPC through the NR gNB.

According to certain embodiments, the electronic device 101 may receive from the first BS, a message indicating that the first BS is connected with the second BS, in operation 909. In the EN-DC environment, the second BS may be the NR gNB.

According to certain embodiments, the electronic device 101 may transmit and/or receive a signal with the second BS and the first core network through the second PDN session by using the second wireless communication, at least partially based on the received message, in operation 911. When the second BS is connected, the electronic device 101 may use the second wireless communication by using any one of the SCG bearer and the split bearer provided in the second PDN session.

Figure 10:
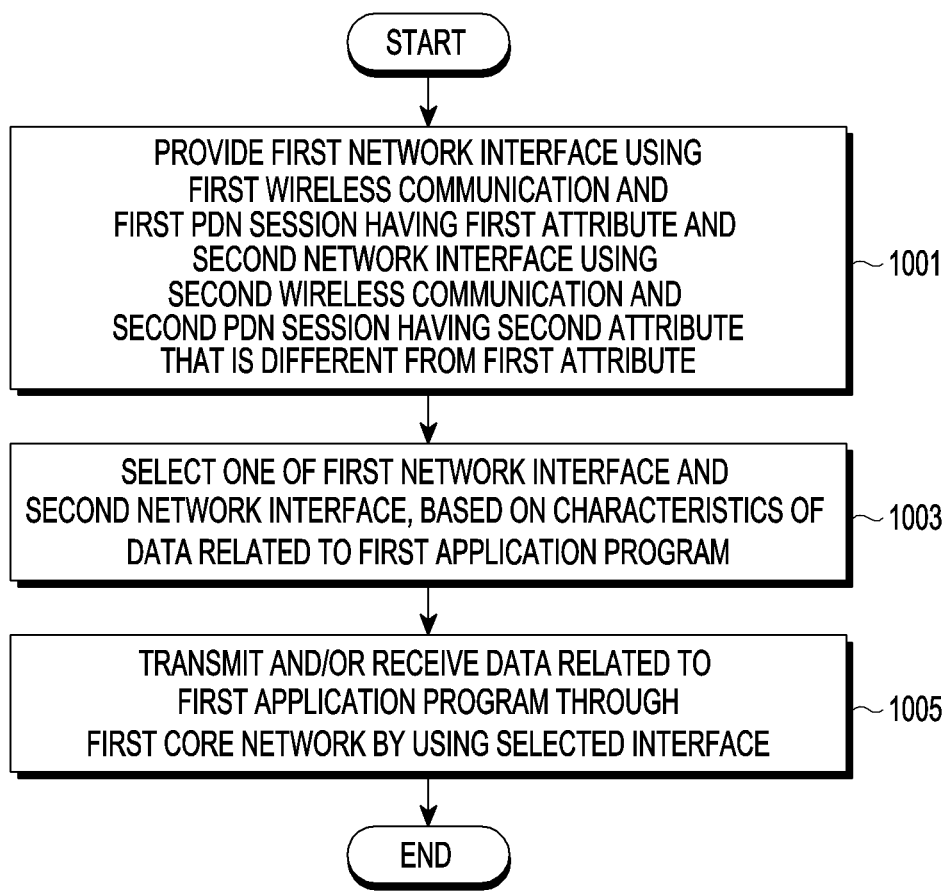
FIG. 10 is a flowchart for describing a method of selecting a PDN session according to certain embodiments.

FIG. 10 is a flowchart for describing a method of selecting a PDN session according to certain embodiments.

Referring to FIG. 10, according to certain embodiments, the electronic device 101 (e.g., the processor 120 of FIG. 1) may provide a first network interface using the first wireless communication and the first PDN session having the first attribute and a second network interface using the second wireless communication and the second PDN session having the second attribute that is different from the first attribute, in operation 1001. For example, the first attribute may indicate that a bearer is connected with the first core network through the first BS, and the second attribute may indicate that the bearer is connected with the first core network through the first BS and/or the second BS. In EN-DC, the first wireless communication may be LTE, and the first PDN session having the first attribute may use the MCG bearer. In EN-DC, the second wireless communication may be NR, and the second PDN session having the second attribute may use any one of the MCG bearer, the SCG bearer, and the split bearer.

According to certain embodiments, the electronic device 101 may select one of the first network interface and the second network interface, based on characteristics of data related to a first application program, in operation 1003. For example, when the characteristics of the data related to the first application program include characteristics requiring stability or mobility, the electronic device 101 may select the first network interface. When the characteristics of the data related to the first application program include characteristics requiring low latency or high data throughput, the electronic device 101 may select the second network interface.

According to certain embodiments, the electronic device 101 may transmit and/or receive data related to the first application program through the first core network by using the selected interface, in operation 1005.

Figure 11:
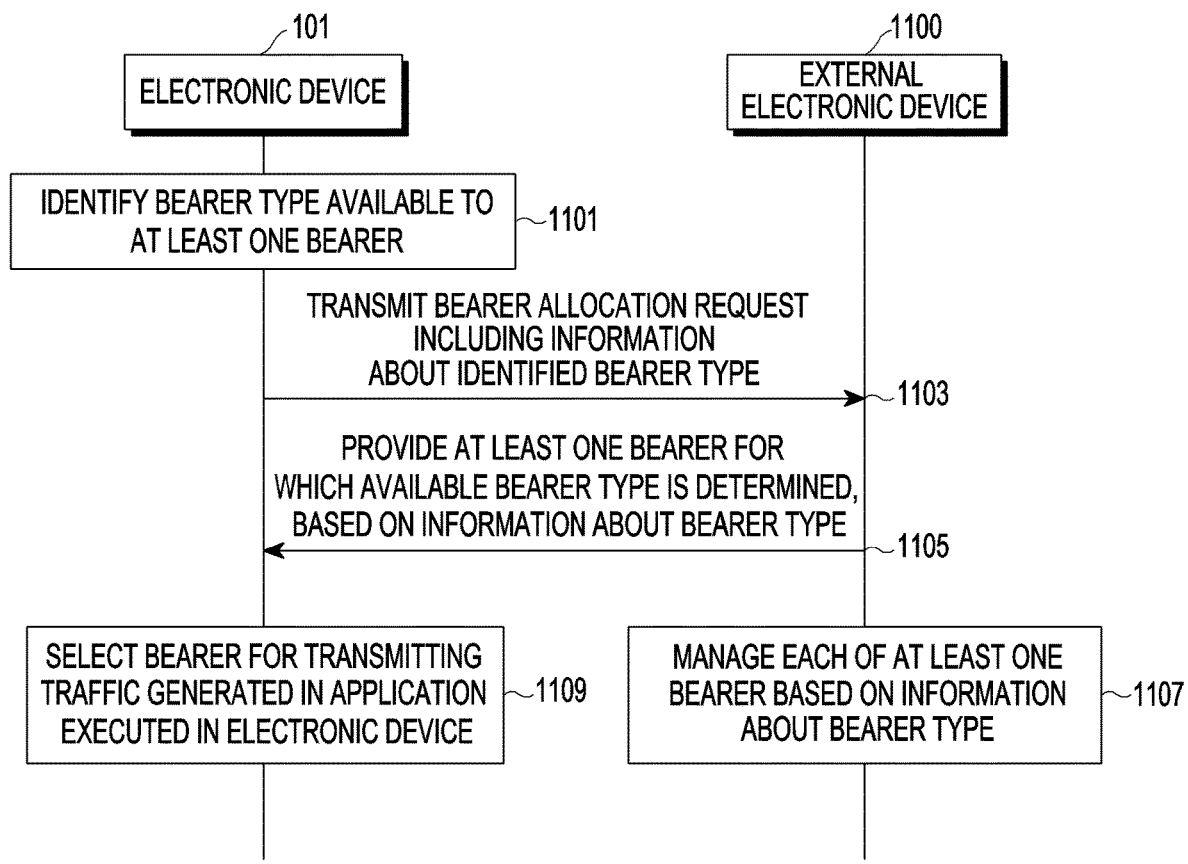
FIG. 11 is a flowchart for describing a bearer management method according to certain embodiments.

FIG. 11 is a flowchart for describing a bearer management method according to certain embodiments.

Referring to FIG. 11, according to certain embodiments, the electronic device 101 (e.g., the processor 120 of FIG. 1) may identify a bearer type available to at least one bearer, in operation 1101. For example, the electronic device 101 may identify the MCG bearer as a bearer type available to a first bearer, and the MCG bearer, the SCG bearer, and the split bearer as bearer types available to a second bearer. When the first bearer uses the MCG bearer, it may mean that a master cell is used even when a secondary cell is connected. When the second bearer uses any one of the MCG bearer, the SCG bearer, or the split bearer, it may mean that the master cell is used when the secondary cell is not connected, and the secondary cell is used when the secondary cell is connected. In EN-DC, the electronic device 101 may use the MCG bearer as a default bearer, and the SCG bearer or the split bearer as a dedicated bearer.

According to certain embodiments, the electronic device 101 may transmit a bearer allocation request including information about the identified bearer type, in operation 1103. For example, in EN-DC, the electronic device 101 may transmit a bearer resource allocation request including an indicator indicating information about a bearer type. For example, in MR-DC, the electronic device 101 may transmit a PDU session modification request including an indicator indicating information about a bearer type.

According to certain embodiments, in operation 1105, an external electronic device 1100 may provide at least one bearer for which an available bearer type is determined, based on information about the bearer type.

According to certain embodiments, in operation 1107, the external electronic device 1100 may manage each of at least one bearer based on the information about the bearer type. For example, the external electronic device 1100 may manage a bearer type available to a created bearer based on information included in a bearer allocation request received from the electronic device 101. When the electronic device 101 identifies the MCG bearer as the bearer type available to the default bearer, the external electronic device 1100 may use the MCG bearer even when the secondary node is added. When the electronic device 101 identifies the MCG bearer, the SCG bearer, and the split bearer as the bearer type available to the dedicated bearer, the external electronic device 1100 may use the SCG bearer or the split bearer when a secondary node (e.g., an NR gNB) is added.

According to certain embodiments, the electronic device 101 may select a bearer for transmitting traffic generated in an application executed in the electronic device 101, in operation 1109. The electronic device 101 may identify at least one bearer through a traffic flow template (TFT) in one PDN session, and may update TFTs of the electronic device 101 and the external electronic device 1100 through bearer modification in case of changes in the TFTs. The electronic device 101 may select a bearer for transmitting traffic generated in an application, based on information about a bearer type included in an API provided in an application OS. When an explicit policy for a bearer type exists in an application, the electronic device 101 may select the bearer for transmitting the traffic generated in the application based on the policy. For example, the policy for the bearer type may be configured as related information in installation of the application, configured by a user's input, or updated from an external server. The electronic device 101 may select the bearer for transmitting the traffic generated in the application, based on an attribute for requirements such as data throughput, stability, mobility, and low-latency of the application.

Figure 12:
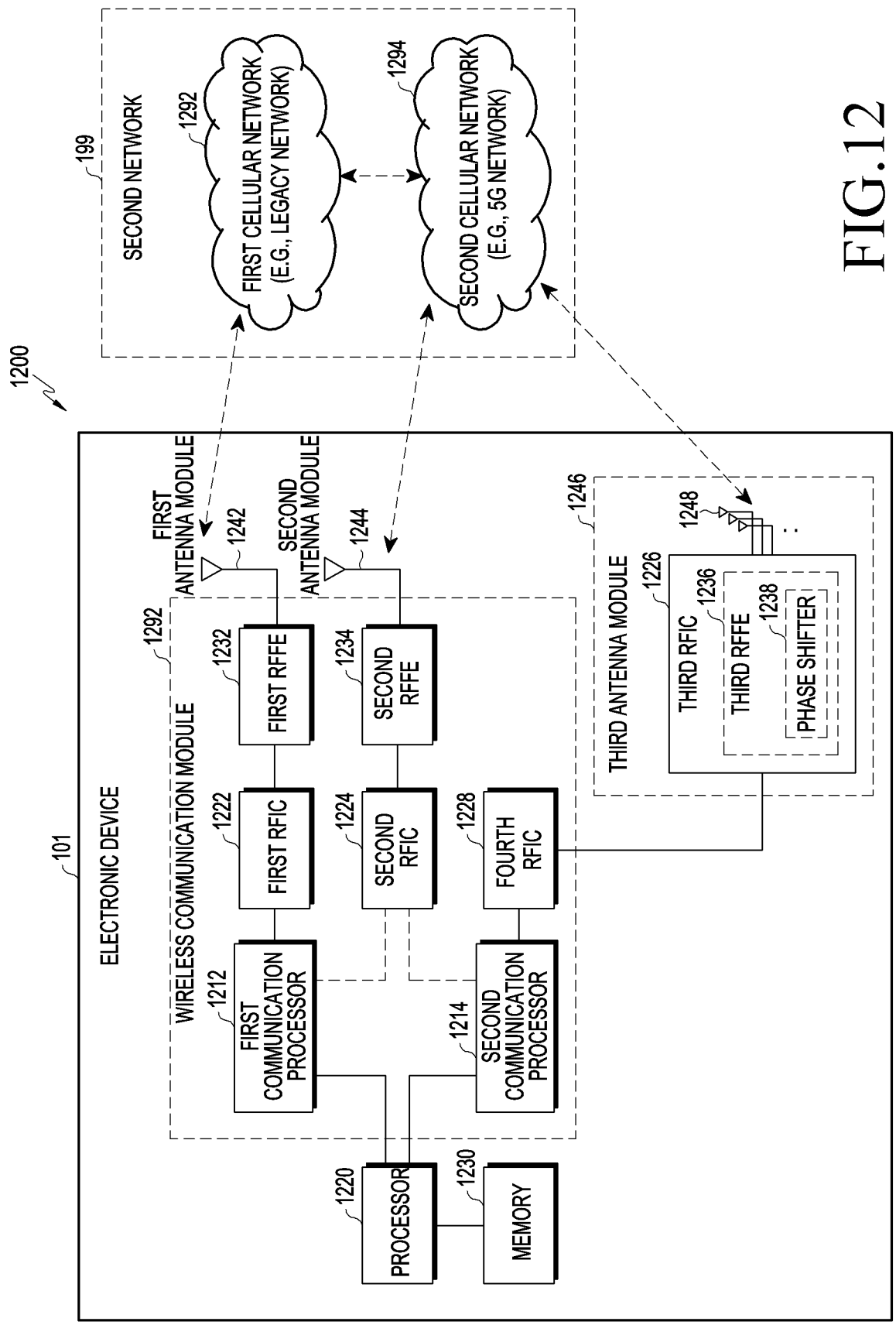
FIG. 12 is a block diagram of an electronic device in a network environment including a plurality of cellular networks, according to certain embodiments.

FIG. 12 is a block diagram 1200 of the electronic device 101 in a network environment including a plurality of cellular networks, according to certain embodiments. Referring to FIG. 12, the electronic device 101 may include a first communication processor 1212, a second communication processor 1214, a first radio frequency integrated circuit (RFIC) 1222, a second RFIC 1224, a third RFIC 1226, a fourth RFIC 1228, a first radio frequency front end (RFFE) 1232, a second RFFE 1234, a first antenna module 1242, a second antenna module 1244, and an antenna 1248. The electronic device 101 may further include a processor 1220 and a memory 1230.

The second network 199 may include a first cellular network 1292 and a second cellular network 1294. According to another embodiment, the electronic device 101 may further include at least one component among components described in FIG. 1, and the second network 199 may further include at least one other network. According to an embodiment, the first communication processor 1212, the second communication processor 1214, the first RFIC 1222, the second RFIC 1224, the third RFIC 1226, the fourth RFIC 1228, the first RFFE 1232, and the second RFFE 1234 may form at least a part of the wireless communication module 1292. According to another embodiment, the fourth RFIC 1228 may be omitted, or may be included as a part of the third RFIC 1226.

The first communication processor 1212 may support establishment of a communication channel of a band to be used for wireless communication with the first cellular network 1292 and legacy network communication made through the established communication channel. According to certain embodiments, the first cellular network may be a legacy network including a 2G, 3G, 4G, or LTE network.

The second communication processor 1214 may support establishment of a communication channel corresponding to a designated band (e.g., about 6 GHz-about 60 GHz) from a band to be used for wireless communication with the second cellular network 1294 and 5G network communication made through the established communication channel. According to certain embodiments, the second cellular network 1294 may be a 5G network defined in the 3$^{rd}$ Generation Partnership Project (3GPP). In addition, according to an embodiment, the first communication processor 1212 or the second communication processor 1214 may support establishment of a communication channel corresponding to another designated band (e.g., about 6 GHz or lower) from a band to be used for wireless communication with the second cellular network 1294 and 5G network communication made through the established communication channel. According to an embodiment, the first communication processor 1212 and the second communication processor 1214 may be implemented in a single chip or a single package. According to certain embodiments, the first communication processor 1212 or the second communication processor 1214 may be implemented in a single chip or a single package with the processor 120, the auxiliary processor 123, or the communication module 190.

The first RFIC 1222 may convert, in transmission, a baseband signal generated by the first communication processor 1212 into an RF signal of about 700 MHz to about 3 GHz used in the first cellular network 1292 (e.g., a legacy network). In reception, the RF signal may be obtained from the first cellular network 1292 (e.g., the legacy network) through an antenna (e.g., the first antenna module 1242) and may be pre-processed by an RFFE (e.g., the first RFFE 1232). The first RFIC 1222 may convert the pre-processed RF signal into the baseband signal such that the RF signal is processable by the first communication processor 1212.

The second RFIC 1224 may convert, in transmission, the baseband signal generated by the first communication processor 1212 or the second communication processor 1214 into an RF signal in a Sub6 band (e.g., about 6 GHz or lower) (hereinafter, a 5G Sub6 RF signal) to be used in the second cellular network 1294 (e.g., a 5G network). In reception, the RF signal may be obtained from the second cellular network 1294 (e.g., the 5G network) through an antenna (e.g., the second antenna module 1244) and may be pre-processed by an RFFE (e.g., the second RFFE 1234). The second RFIC 1224 may convert the pre-processed 5G Sub6 RF signal into the baseband signal such that the RF signal is processable by a corresponding communication processor between the first communication processor 1212 and the second communication processor 1214.

The third RFIC 1226 may convert the baseband signal generated by the second communication processor 1214 into an RF signal in an Above6 band (e.g., about 6 GHz-about 60 GHz) (hereinafter, a 5G Above6 RF signal) to be used in the second cellular network 1294 (e.g., the 5G network). In reception, the 5G Above6 RF signal may be obtained from the second cellular network 1294 (e.g., the 5G network) through an antenna (e.g., the antenna 1248) and may be pre-processed by the third RFFE 1236. The third RFIC 1226 may convert the pre-processed 5G Above6 RF signal into the baseband signal such that the RF signal is processable by the second communication processor 1214. According to an embodiment, the third RFFE 1236 may be formed as a part of the third RFIC 1226.

According to an embodiment, the electronic device 101 may include the fourth RFIC 1228 separately from or at least a part of the third RFIC 1226. In this case, the fourth RFIC 1228 may convert the baseband signal generated by the communication processor 1214 into an RF signal in an intermediate frequency band (e.g., about 9 GHz-about 11 GHz) (hereinafter, an IF signal), and deliver the IF signal to the third RFIC 1226. The third RFIC 1226 may convert the IF signal into the 5G Above6 RF signal. In reception, the 5G Above6 RF signal may be received from the second cellular network 1294 (e.g., the 5G network) through an antenna (e.g., the antenna 1248) and may be converted into the IF signal by the third RFFE 1226. The fourth RFIC 1228 may convert the IF signal into the baseband signal such that the IF signal is processable by the second communication processor 1214.

According to an embodiment, the first RFIC 1222 and the second RFIC 1224 may be implemented as at least a part of a single chip or a single package. According to an embodiment, the first RFFE 1232 and the second RFFE 1234 may be implemented as at least a part of a single chip or a single package. According to an embodiment, at least one of the first antenna module 1242 or the second antenna module 1244 may be omitted or may be coupled with another antenna module to process RF signals in a plurality of corresponding bands.

According to an embodiment, the third RFIC 1226 and the antenna 1248 may be arranged in the same substrate to form the third antenna module 1246. For example, the wireless communication module 192 or the processor 120 may be arranged on a first substrate (e.g., a main printed circuit board (PCB)). In this case, the third RFIC 1226 may be arranged on a partial region (e.g., a bottom surface) of a second substrate (e.g., a sub PCB) that is separate from the first substrate, and the antenna 1248 may be arranged on another region (e.g., a top surface) of the second substrate, thus forming the third antenna module 1246. By arranging the third RFIC 1226 and the antenna 1248 on the same substrate, a length of a transmission line therebetween may be reduced. Thus, it is possible to reduce a loss (e.g., attenuation) of a signal in a high frequency band (e.g., about 6 GHz-about 60 GHz) used in the 5G network due to a transmission line. Consequently, the electronic device 101 may improve the quality or speed of communication with the second cellular network 1294 (e.g., the 5G network).

According to an embodiment, the antenna 1248 may be formed as an antenna array including a plurality of antenna elements available for beamforming. In this case, the third RFIC 1226 may include a plurality of phase shifters 1238 corresponding to the plurality of antenna elements, as a part of the third RFFE 1236. In transmission, each of the plurality of phase shifters 1238 may shift a phase of the 5G Above6 RF signal to be transmitted to the outside (e.g., a base station of the 5G network) of the electronic device 101 through a corresponding antenna element. In reception, each of the plurality of phase shifters 1238 may shift the phase of the 5G Above6 RF signal received from the outside through the corresponding antenna element into an identical or substantially identical phase. This enables transmission or reception through beamforming between the electronic device 101 and the outside.

The second cellular network 1294 (e.g., a 5G network) may be managed independently of (e.g., stand-alone (SA)) or in connection with (e.g., non-stand alone (NSA)) the first cellular network 1292 (e.g., the legacy network). For example, in the 5G network, an access network (e.g., a 5G radio access network (RAN) or a next-generation (NG) RAN) may exist, and a core network (e.g., next-generation core (NGC)) may not exist. In this case, the electronic device 101 may access the access network of the 5G network and then access an external network (e.g., Internet) under control of a core network (e.g., an EPC) of the legacy network. Protocol information (e.g., LTE protocol information) for communication with the legacy network or protocol information (e.g., NR protocol information) for communication with the 5G network may be stored in the memory 1230 and may be accessed by another component (e.g., the processor 120, the first communication processor 1212, or the second communication processor 1214).

Figure 13A:
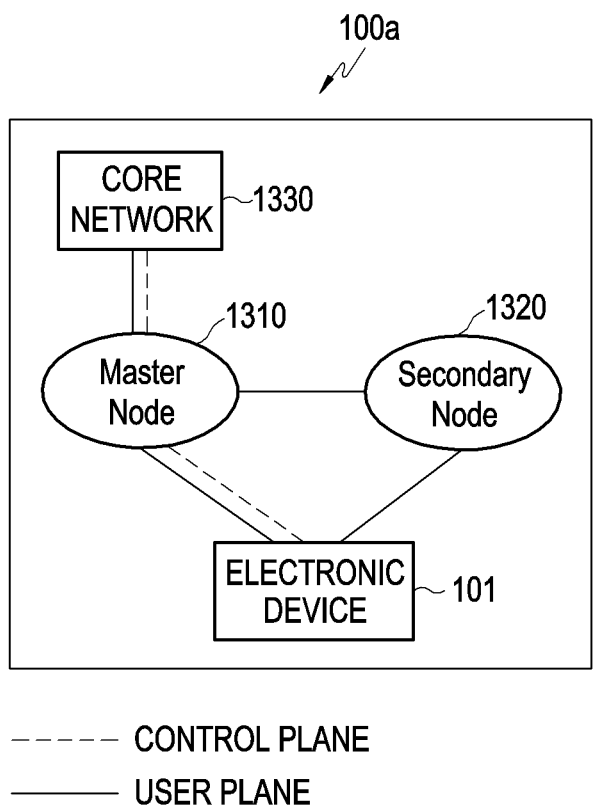
FIGS. 13A through 13C are diagrams of wireless communication systems that provide a network of legacy communication and/or 5G communication, according to certain embodiments.
Figure 13B:
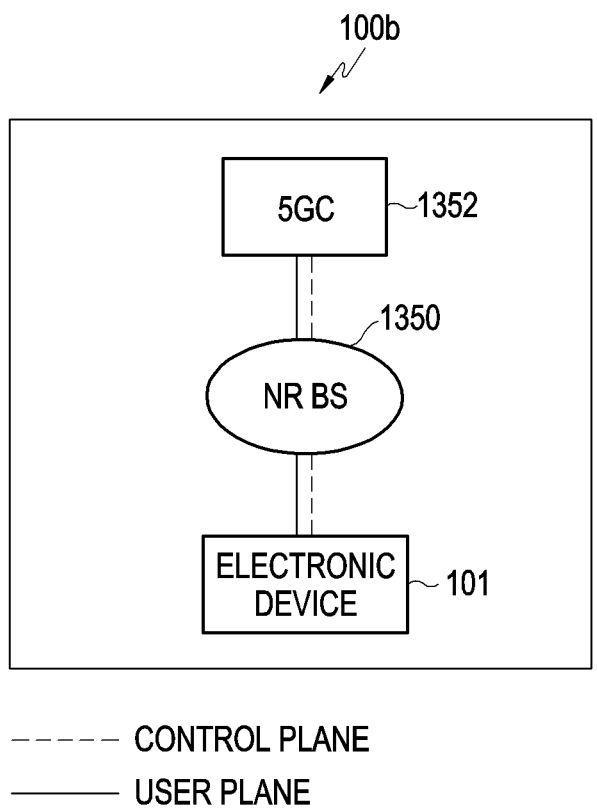
Figure 13C:
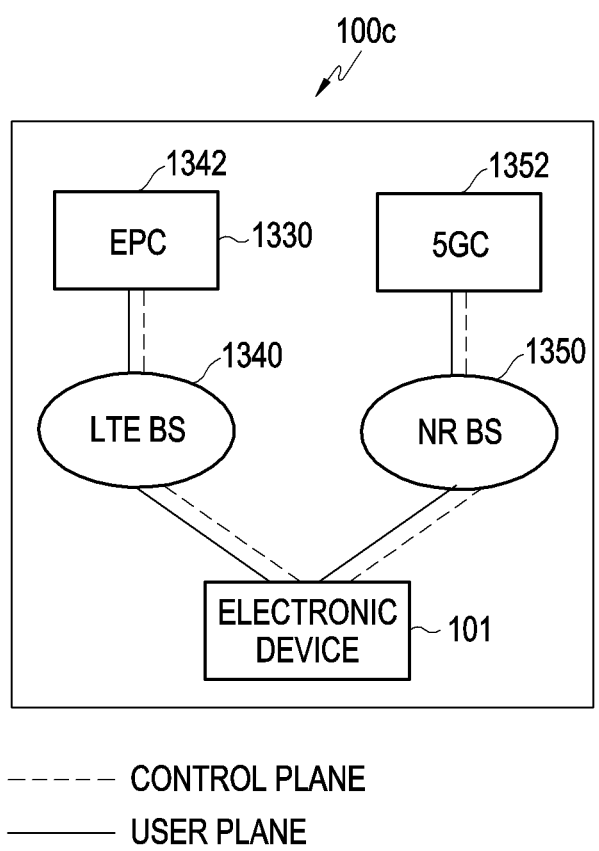

FIGS. 13A through 13C are diagrams of wireless communication systems that provide a network of legacy communication and/or 5G communication, according to certain embodiments. Referring to FIGS. 13A through 13C, network environments 100a through 100c may include at least one of a legacy network or a 5G network. The legacy network may include a 4G or LTE BS 1340 (e.g., an eNB) of the 3GPP standard, which supports wireless connection with the electronic device 101 and an EPC 1342 managing 4G communication. The 5G network may include an NR BS 1350 (e.g., a gNB) supporting wireless connection with the electronic device 101 and a 5G core (5GC) 1352 managing 5G communication of the electronic device 101.

According to certain embodiments, the electronic device 101 may transmit and receive a control message and user data through legacy communication and/or 5G communication. The control message may include a message related to at least one of security control, bearer setup, authentication, registration, or mobility management of the electronic device 101. The user data may mean user data except for a control message transmitted and received between the electronic device 101 and a core network 1330 (e.g., the EPC 1342).

Referring to FIG. 13A, the electronic device 101 according to an embodiment may transmit and receive at least one of a control message or user data with at least a part of a 5G network (e.g., the NR BS 1350 or the 5GC 1352) by using at least a part of the legacy network (e.g., the LTE BS 1340 or the EPC 1342).

According to certain embodiments, the network environment 100a may include a network environment that provides wireless communication DC to the LTE BS 1340 and the NR BS 1350 and transmits and receives a control message with the electronic device 101 through the core network 1330 of one of the EPC 1342 and the 5GC 1352.

According to certain embodiments, in a DC environment, one of the LTE BS 1340 and the NR BS 1350 may operate as a master node (MN) 1310 and the other may operate as a secondary node (SN) 1320. The MN 1310 may be connected with the core network 1330 to transmit and receive a control message. The MN 1310 and the SN 1320 may be connected with each other through a network interface and transmit and receive a message related to management of a radio resource (e.g., a communication channel).

According to certain embodiments, the MN 1310 may be configured with the LTE BS 1340, the SN 1320 may be configured with the NR BS 1350, and the core network 1330 may be configured with the EPC 1342. For example, the control message may be transmitted and received through the LTE BS 1340 and the EPC 1342, and the user data may be transmitted and received through the LTE BS 1340 and the NR BS 1350.

According to certain embodiments, the MN 1310 may be configured with the NR BS 1350, the SN 1320 may be configured with the LTE BS 1340, and the core network 1330 may be configured with the 5GC 1352. For example, the control message may be transmitted and received through the LTE BS 1340 and the EPC 1342, and the user data may be transmitted and received through the LTE BS 1340 and the NR BS 1350.

Referring to FIG. 13B, according to certain embodiments, the 5G network may be configured with the NR BS 1350 and the 5GC 1352, and the control message and the user data may be transmitted and received independently of the electronic device 101.

Referring to FIG. 13C, the legacy network and the 5G network according to certain embodiments may provide data transmission and reception independently of each other. For example, the electronic device 101 and the EPC 1342 may transmit and receive the control message and the user data through the LTE BS 1340. For example, the electronic device 101 and the 5GC 1352 may transmit and receive the control message and the user data through the NR BS 1350.

According to certain embodiments, the electronic device 101 may be registered in at least one of the EPC 1342 or the 5GC 1352 and transmit and receive the control message.

According to certain embodiments, the EPC 1342 or the 5GC 1352 may interwork to manage communication of the electronic device 101. For example, mobility information of the electronic device 101 may be transmitted and received through an interface between the EPC 1342 and the 5GC 1352.

According to certain embodiments, an electronic device includes at least one processor (e.g., the processor 120) and a memory operatively connected with the processor (e.g., the processor 120) and storing a plurality of identifiers related to communication bearer attributes, in which the memory (e.g., the memory 130) stores instructions that, when executed by the at least one processor cause the electronic device to receive information related to MR-DC from a first BS connected with a first core network, by using the a first frequency band, to transmit a first PDN connectivity request including a first identifier and a second PDN connectivity request including a second identifier among the identifiers to the first BS, by using the first frequency band, to establish a first PDN session with the first BS and the first core network, in which the first PDN session provides a communication bearer having a first attribute related to the first identifier, to establish a second PDN session with the first BS and the first core network, in which the second PDN session provides a communication bearer having a second attribute related to the second identifier, to receive from the first BS, a message indicating that the first BS is connected with a second BS, and to transmit and/or receive a signal to and/or from the second BS and the first core network through the second PDN session based on at least a part of the message, by using a second frequency band.

According to certain embodiments, the identifiers include address information related to at least one P-GW that provides the first PDN session and the second PDN session.

According to certain embodiments, the first attribute may indicate that the bearer is connected with the first core network through the first BS, and the second attribute may indicate that the bearer is connected with the first core network through the first BS and/or the second BS.

According to certain embodiments, an electronic device includes at least one processor (e.g., the processor 120) and a memory (e.g., the memory 130) operatively connected with the processor (e.g., the processor 120) and storing a first application program, in which the memory (e.g., the memory 130) stores instructions that, when executed, cause the processor (e.g., the processor 120) to provide a first network interface using a first frequency band and the first PDN session having the first attribute and a second network interface using a second frequency band and the second PDN session having the second attribute that is different from the first attribute, to select one of the first network interface and the second network interface, based on characteristics of data related to the first application program, to transmit and/or receive the data related to the first application program to and/or from a first core network by using the selected interface, in which the first attribute indicates a connection with the first core network through the first BS, and the second attribute indicates a capability of a connection with the first core network through the first BS and/or the second BS.

According to certain embodiments, the first frequency range falls within an NR band, and the second frequency band falls within the LTE band, and the instructions cause the processor (e.g., the processor 120) to select the second network interface when the characteristics of the data related to the first application program include characteristics related to a call.

According to certain embodiments, the instructions cause the processor (e.g., the processor 120) to select the second network interface when the characteristics of the data related to the first application program include characteristics requiring high transmission speed.

According to certain embodiments, the instructions cause the processor (e.g., the processor 120) to select the first network interface when the characteristics of the data related to the first application program include characteristics requiring stability.

According to certain embodiments, the first frequency range falls within the NR band, and the second frequency band falls within the LTE band, and the instructions cause the processor (e.g., the processor 120) to select the second network interface when the characteristics of the data related to the first application program include the characteristics related to the call.

According to certain embodiments, the instructions cause the processor (e.g., the processor 120) to select the first network interface when the characteristics of the data related to the first application program include the characteristics requiring the high transmission speed.

According to certain embodiments, the instructions cause the processor (e.g., the processor 120) to select the first network interface when the characteristics of the data related to the first application program include the characteristics requiring the stability.

According to certain embodiments, an electronic device includes a housing, a wireless communication circuit (e.g., the communication module 190) arranged in the housing, a processor (e.g., the processor 120) operatively connected with the wireless communication circuit (e.g., the communication module 190), and a memory (e.g., the memory 130) operatively connected with the processor (e.g., the processor 120), in which the memory (e.g., the memory 130) stores instructions that, when executed, cause the processor (e.g., the processor 120) to detect an event configured for establishment of at least one PDN session, to configure an attribute of at least one PDN session related to a bearer type available to each of the at least one PDN session, to transmit a connectivity request for each of the at least one PDN session having the configured attribute of the at least one PDN session to an external electronic device through the wireless communication circuit (e.g., the communication module 190), and to establish the at least one PDN session having each of the configured attribute of the at least one PDN session.

According to certain embodiments, the instructions cause the processor (e.g., the processor 120) to select a PDN session for transmitting traffic generated from an application executed in the electronic device from the at least one PDN session and to transmit the traffic or receive reception traffic corresponding to the traffic through the wireless communication circuit (e.g., the communication module 190), by using the selected PDN session.

According to certain embodiments, the instructions cause the processor (e.g., the processor 120) to, as a part of the selecting of the PDN session for transmitting the traffic generated from the application executed in the electronic device from the at least one PDN session, identify an attribute including at least one of throughput, stability, mobility, or low latency of the application and to select the PDN session for transmitting the traffic generated from the application based on the identified attribute.

According to certain embodiments, the instructions cause the processor (e.g., the processor 120) to, as a part of the selecting of the PDN session for transmitting the traffic generated from the application executed in the electronic device from the at least one PDN session, select the PDN session for transmitting the traffic generated from the application based on information included in the application.

According to certain embodiments, the connectivity request for each of the at least one PDN session may include an APN, and the external electronic device may identify a bearer type available to each of the at least one PDN session based on information about the APN.

According to certain embodiments, the connectivity request for each of the at least one PDN session may include an indicator indicating the bearer type available to each of the at least one PDN session.

According to certain embodiments, the bearer type may be any one of an MCG bearer using a master node, an SCG bearer using a secondary node, or a split bearer using the master node and the secondary node.

According to certain embodiments, the electronic device may be dual-connected with an LTE BS as a master node and with an NR BS as a secondary node, a first PDN session of the at least one PDN session may be a PDN session to which the MCG bearer is available, and a second PDN session of the at least one PDN session may be a PDN session to which all of the MCG bearer, the SCG bearer, and the split bearer are available.

According to certain embodiments, the instructions may cause the processor (e.g., the processor 120) to use the first PDN session when the traffic generated from the application executed in the electronic device includes characteristics requiring stability.

According to certain embodiments, the instructions may cause the processor (e.g., the processor 120) to use the second PDN session when the traffic generated from the application executed in the electronic device includes characteristics requiring low latency.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to certain embodiments, there may be provided an electronic device that creates a plurality of Internet sessions for which available bearers are differently configured and selects an Internet session according to characteristics of an application, and an operation method of the electronic device. Thus, data may be transmitted and received using an Internet session based on characteristics of an application.

The embodiments disclosed herein have been provided for description and understanding of disclosed technical matters and are not intended to limit the scope of the present disclosure. Therefore, it should be construed that the scope of the present disclosure includes any change or other certain embodiments based on the technical spirit of the present disclosure.

What is claimed is:

1. An electronic device comprising:
  at least one processor; and
  a memory operatively connected with the at least one processor and storing a plurality of identifiers related to communication bearer attributes,
  wherein the memory stores instructions that, when executed by the at least one processor, cause the electronic device to:
    receive information related to multi radio access technology (RAT) dual connectivity (MR-DC) from a first base station (BS) connected with a first core network, using a first frequency band;
    transmit a first packet data network (PDN) connectivity request comprising a first identifier among the plurality of identifiers and a second PDN connectivity request comprising a second identifier among the plurality of identifiers to the first BS, using the first frequency band;
    establish a first PDN session with the first BS and the first core network, in which the first PDN session provides a communication bearer having a first communication bearer attribute related to the first identifier;
    establish a second PDN session with the first BS and the first core network, in which the second PDN session provides a communication bearer having a second communication bearer attribute related to the second identifier;
    receive from the first BS, a message indicating that the first BS is connected with a second BS; and
    communicate using signals with the second BS and the first core network through the second PDN session based on at least a part of the message, using a second frequency band.

2. The electronic device of claim 1, wherein the identifiers comprise address information related to at least one PDN-gateway (P-GW) that provides the first PDN session and the second PDN session.

3. The electronic device of claim 1, wherein the first communication bearer attribute indicates connection with the first core network only through the first BS, and the second communication bearer attribute indicates connectability with the first core network through the second BS.

4. An electronic device comprising:
  at least one processor; and
  a memory operatively connected with the processor and storing a first application program,
  wherein the memory stores instructions that, when executed by the at least one processor, cause the electronic device to:
    provide a first network interface using a first frequency band and a first packet data network (PDN) session having a first attribute and a second network interface using a second frequency band and a second PDN session having a second attribute that is different from the first attribute;
    select one of the first network interface and the second network interface, based on characteristics of data related to the first application program; and
    communicate data related to the first application program with a first core network using a selected interface of the first network interface and the second network interface,
  wherein the first attribute indicates a connection with the first core network only through a first base station (BS), and the second attribute indicates a capability of a connection with the first core network through the first BS or a second BS.

5. The electronic device of claim 4, wherein the first frequency band falls within a long term evolution (LTE) band, and the second frequency band falls within a new radio (NR) band, and the instructions are configured to cause the electronic device to select the first network interface when the characteristics of the data related to the first application program comprise characteristics related to a call.

6. The electronic device of claim 5, wherein the instructions are configured to cause the electronic device to select the second network interface when the characteristics of the data related to the first application program comprise characteristics requiring high transmission speed.

7. The electronic device of claim 5, wherein the instructions are configured to cause the electronic device to select the first network interface when the characteristics of the data related to the first application program comprise characteristics requiring stability.

8. The electronic device of claim 4, wherein the first frequency band falls within new radio (NR) band, and the second frequency band falls within a long term evolution (LTE) band, and the instructions are configured to cause the electronic device to select the second network interface when the characteristics of the data related to the first application program comprise the characteristics related to a call.

9. The electronic device of claim 8, wherein the instructions are configured to cause the electronic device to select the first network interface when the characteristics of the data related to the first application program comprise characteristics requiring high transmission speed.

10. The electronic device of claim 8, wherein the instructions are configured to cause the electronic device to select the first network interface when the characteristics of the data related to the first application program comprise the characteristics requiring stability.

11. An electronic device comprising:
  a housing;
  a wireless communication circuit arranged in the housing;
  at least one processor operatively connected with the wireless communication circuit; and
  a memory operatively connected with the at least one processor,
  wherein the memory stores instructions that, when executed by the at least one processor, are configured to cause the electronic device to:
    detect an event configured for establishment of at least one packet data network (PDN) session;
    configure an attribute of the at least one PDN session related to a bearer type available to each of the at least one PDN session;
    transmit a connectivity request for each of the at least one PDN session having the configured attribute of the at least one PDN session to an external electronic device through the wireless communication circuit; and
    establish the at least one PDN session having each of the configured attribute of the at least one PDN session.

12. The electronic device of claim 11, wherein the instructions are configured to cause the electronic device to:
  select a PDN session for transmitting traffic generated from an application executed in the electronic device from the at least one PDN session; and
  transmit the traffic or receive reception traffic corresponding to the traffic through the wireless communication circuit, by using the selected PDN session.

13. The electronic device of claim 12, wherein the instructions are configured to cause the electronic device to, as a part of selecting of the PDN session for transmitting the traffic generated from the application executed in the electronic device from the at least one PDN session, identify an attribute comprising at least one of throughput, stability, mobility, or low latency of the application and select the PDN session for transmitting the traffic generated from the application based on the identified attribute.

14. The electronic device of claim 12, wherein the instructions are configured to cause the electronic device to, as a part of selecting of the PDN session for transmitting the traffic generated from the application executed in the electronic device from the at least one PDN session, select the PDN session for transmitting the traffic generated from the application based on information included in the application.

15. The electronic device of claim 11, wherein the connectivity request for each of the at least one PDN session comprises an access point name (APN), and the external electronic device identifies a bearer type available to each of the at least one PDN session based on information about the APN.

16. The electronic device of claim 11, wherein the connectivity request for each of the at least one PDN session comprises an indicator indicating the bearer type available to each of the at least one PDN session.

17. The electronic device of claim 11, wherein the bearer type is any one of a master cell group (MCG) bearer using a master node, a secondary cell group (SCG) bearer using a secondary node, or a split bearer using the master node and the secondary node.

18. The electronic device of claim 17, wherein the electronic device is dual-connected with a long term evolution (LTE) base station (BS) as the master node and with a new radio (NR) BS as the secondary node,
- a first PDN session of the at least one PDN session is a PDN session to which the MCG bearer is available, and
- a second PDN session of the at least one PDN session is a PDN session to which all of the MCG bearer, the SCG bearer, and the split bearer are available.

19. The electronic device of claim 18, wherein the instructions are configured to cause the electronic device to use the first PDN session when traffic generated from an application executed in the electronic device comprises characteristics requiring stability.

20. The electronic device of claim 18, wherein the instructions are configured to cause the processor to use the second PDN session when traffic generated from an application executed in the electronic device comprises characteristics requiring low latency.

* * * * *